United States Patent [19]
Takeuchi et al.

[11] Patent Number: 5,993,006
[45] Date of Patent: Nov. 30, 1999

[54] APPARATUS FOR SYNTHESIZING AND DISPLAYING IMAGES

[75] Inventors: Yoshinobu Takeuchi, Kuwana; Seiichiro Suzuki, Nagoya; Tooru Matsumoto, Ichinomiya; Satoru Kadowaki, Mie-gun, all of Japan

[73] Assignee: Denso Corporation, Kariya, Japan

[21] Appl. No.: 09/090,952

[22] Filed: Jun. 5, 1998

[30] Foreign Application Priority Data

| | | | |
|---|---|---|---|
| Jun. 6, 1997 | [JP] | Japan | 9-165353 |
| Dec. 4, 1997 | [JP] | Japan | 9-352310 |
| Mar. 31, 1998 | [JP] | Japan | 10-105810 |

[51] Int. Cl.⁶ .................................................. G03B 21/14
[52] U.S. Cl. .................................. 353/30; 353/75; 359/13
[58] Field of Search .................................. 353/28, 30, 29, 353/75, 74; 359/13, 30, 33, 443, 445; 348/13, 15, 20, 40, 143, 150, 151; 345/9.7

[56] References Cited

U.S. PATENT DOCUMENTS

| | | |
|---|---|---|
| 4,400,725 | 8/1983 | Tanigaki . |
| 4,821,307 | 4/1989 | Flint, III . |
| 4,928,301 | 5/1990 | Smoot . |
| 5,117,285 | 5/1992 | Nelson et al. ............... 348/14 |
| 5,187,597 | 2/1993 | Kato et al. .................. 359/13 |
| 5,282,027 | 1/1994 | Tanigaki et al. ........... 348/14 |
| 5,317,405 | 5/1994 | Kuriiki et al. .............. 348/20 |
| 5,406,323 | 4/1995 | Tanigaki et al. ........... 348/15 |
| 5,422,683 | 6/1995 | Tanigaki ..................... 348/14 |
| 5,532,736 | 7/1996 | Kuriki et al. ................ 348/20 |
| 5,612,733 | 3/1997 | Flohr .......................... 348/14 |
| 5,666,155 | 9/1997 | Mersereau .................. 348/14 |
| 5,777,665 | 7/1998 | McNelley et al. .......... 348/14 |
| 5,801,758 | 9/1998 | Heirich ....................... 348/14 |

FOREIGN PATENT DOCUMENTS

| | | |
|---|---|---|
| 59-149582 | 8/1984 | Japan . |
| 63-280293 | 11/1988 | Japan . |
| 3-60375 | 6/1991 | Japan . |
| 5-328336 | 12/1993 | Japan . |
| 6-30406 | 2/1994 | Japan . |
| 8-155134 | 6/1996 | Japan . |
| 8-249548 | 9/1996 | Japan . |

*Primary Examiner*—William Dowling
*Attorney, Agent, or Firm*—Pillsbury Madison & Sutro LLP

[57] ABSTRACT

An apparatus synthesizes the image of a viewer and a second image into a synthesized image and displays the synthesized image. The apparatus is capable of aligning the line of sight of the viewer with the line of sight of the displayed image of the viewer and correctly reproducing colors on the synthesized image. The apparatus has a transparent hologram screen (15) on which a diffuser is recorded, a camera (25) for imaging a viewer (81) through the hologram screen, a synthesizer (28) for synthesizing the image of the viewer and a second image into a synthesized image, and a projector (11) for projecting signal light (31) containing the synthesized image onto the hologram screen. In place of the synthesizer, a display unit may be arranged behind the viewer. The hologram screen (15) may be combined with a mirror or a half-mirror.

25 Claims, 23 Drawing Sheets

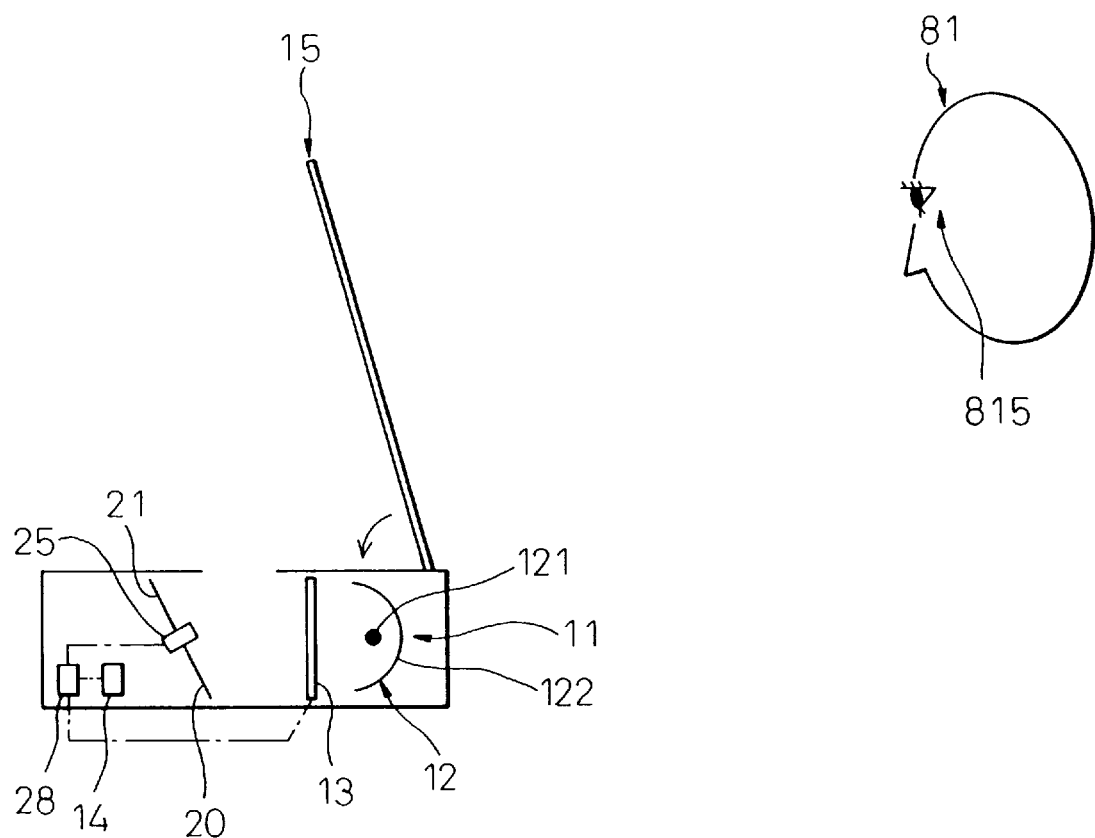

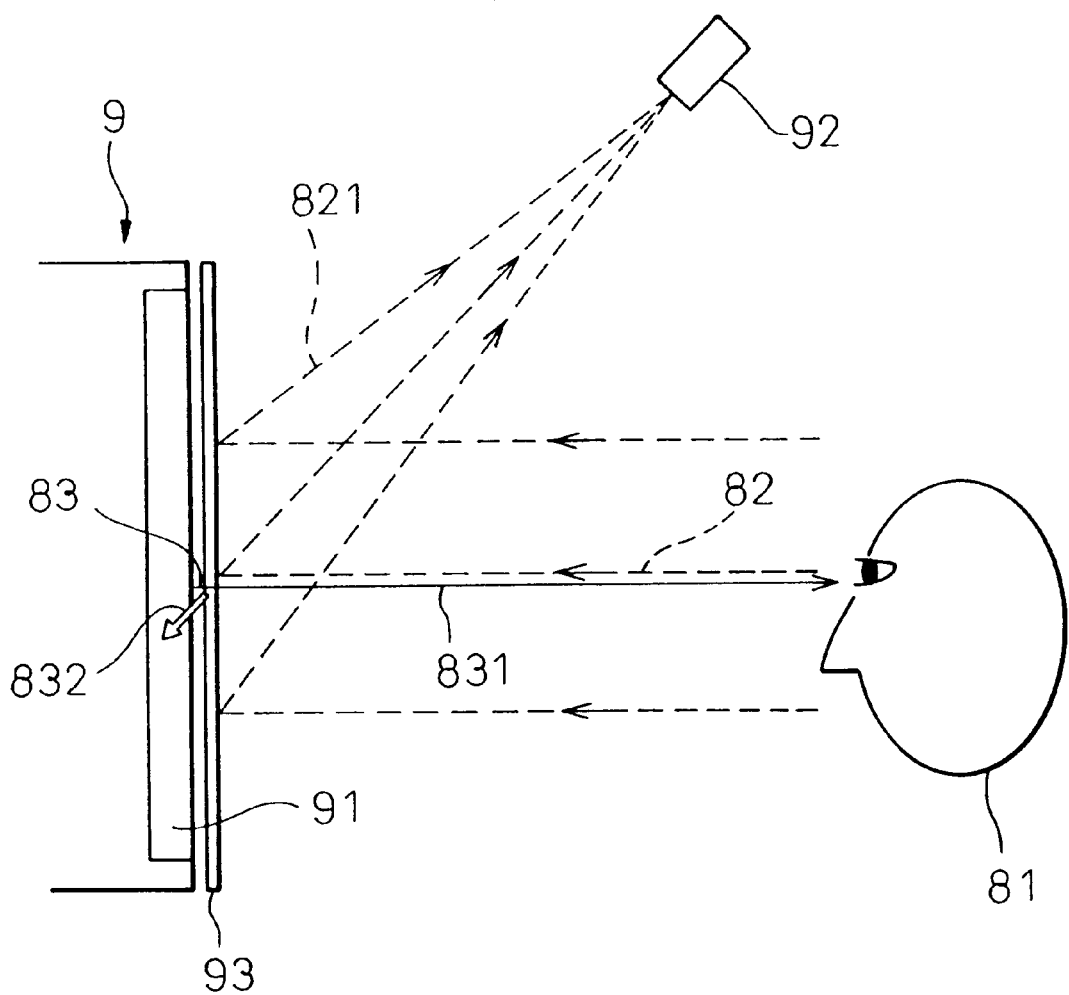

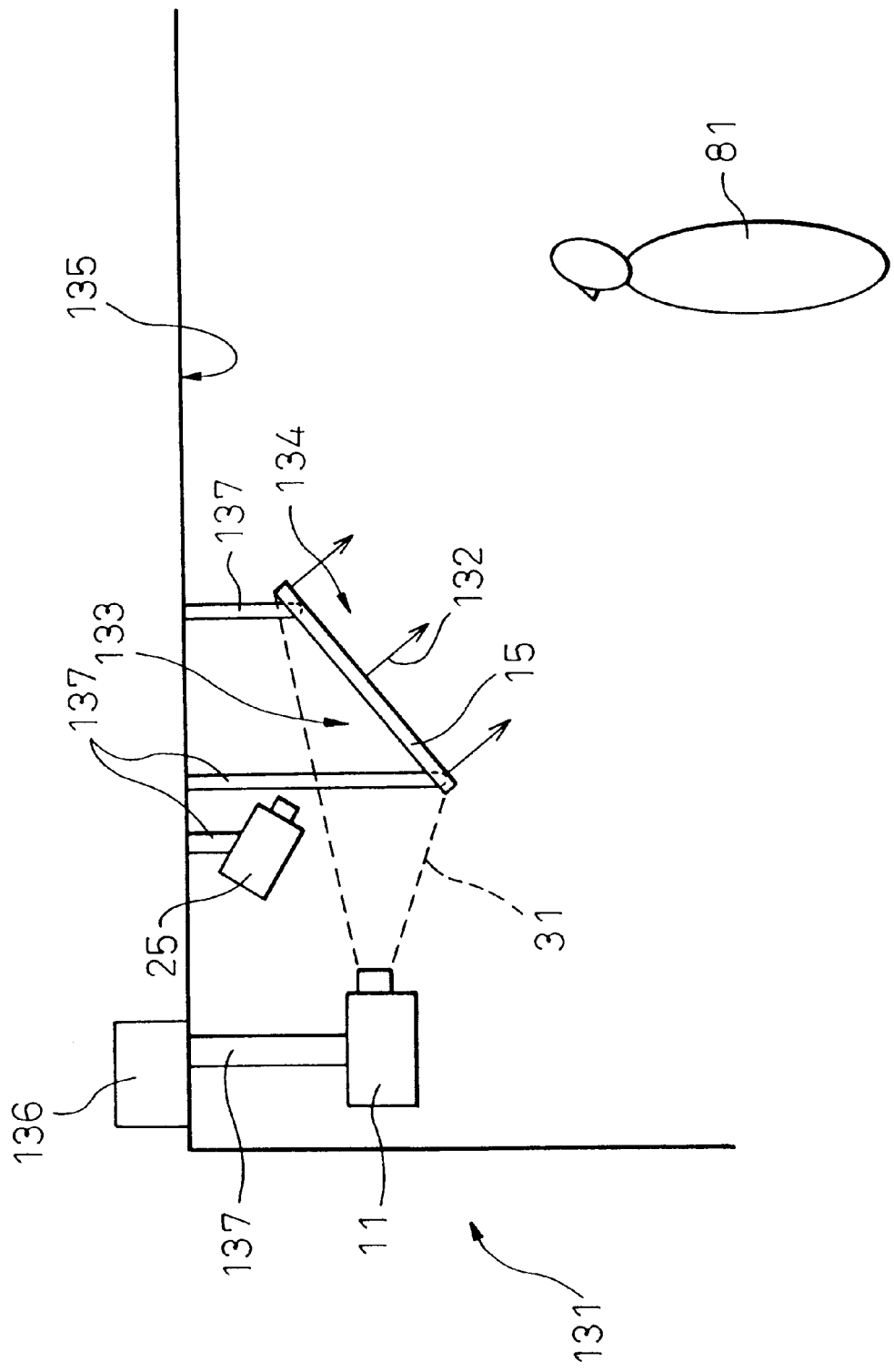

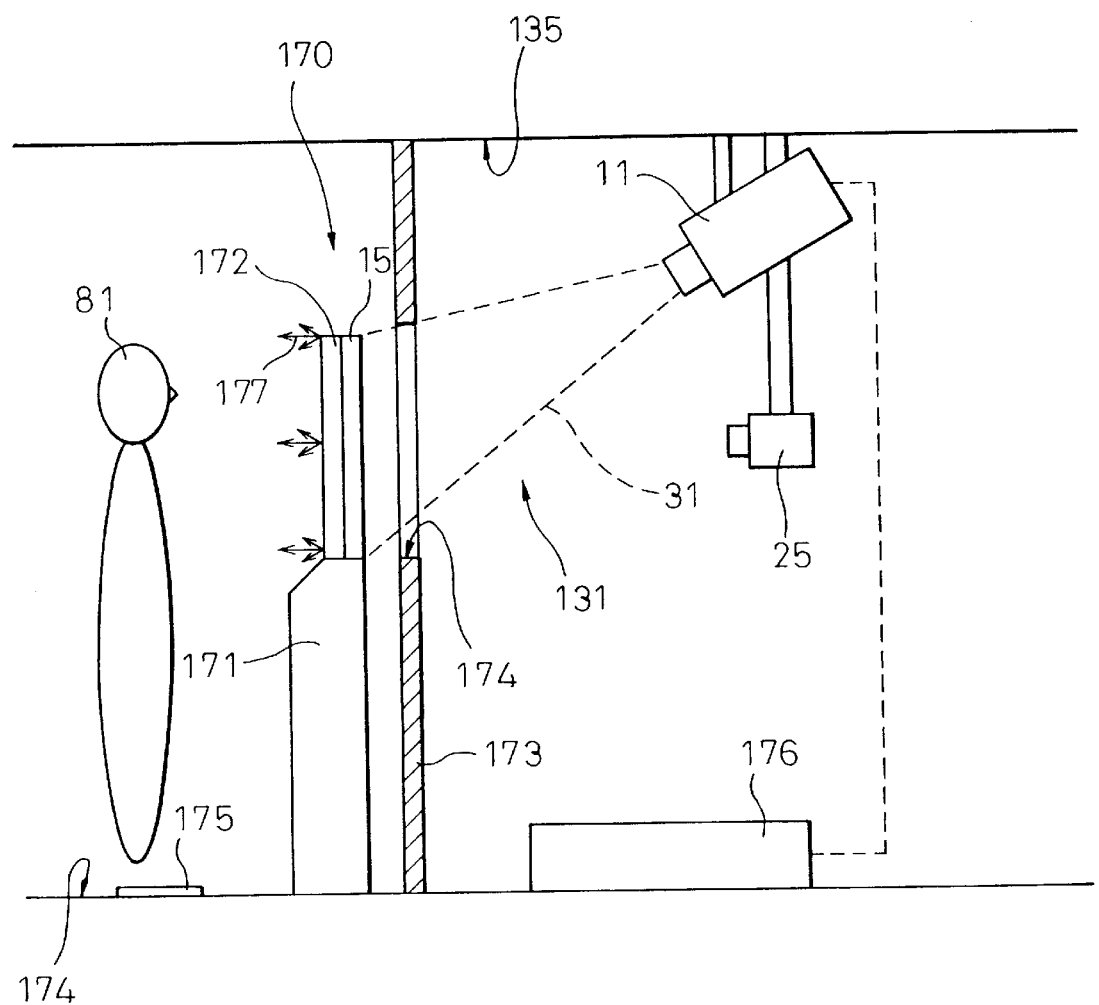

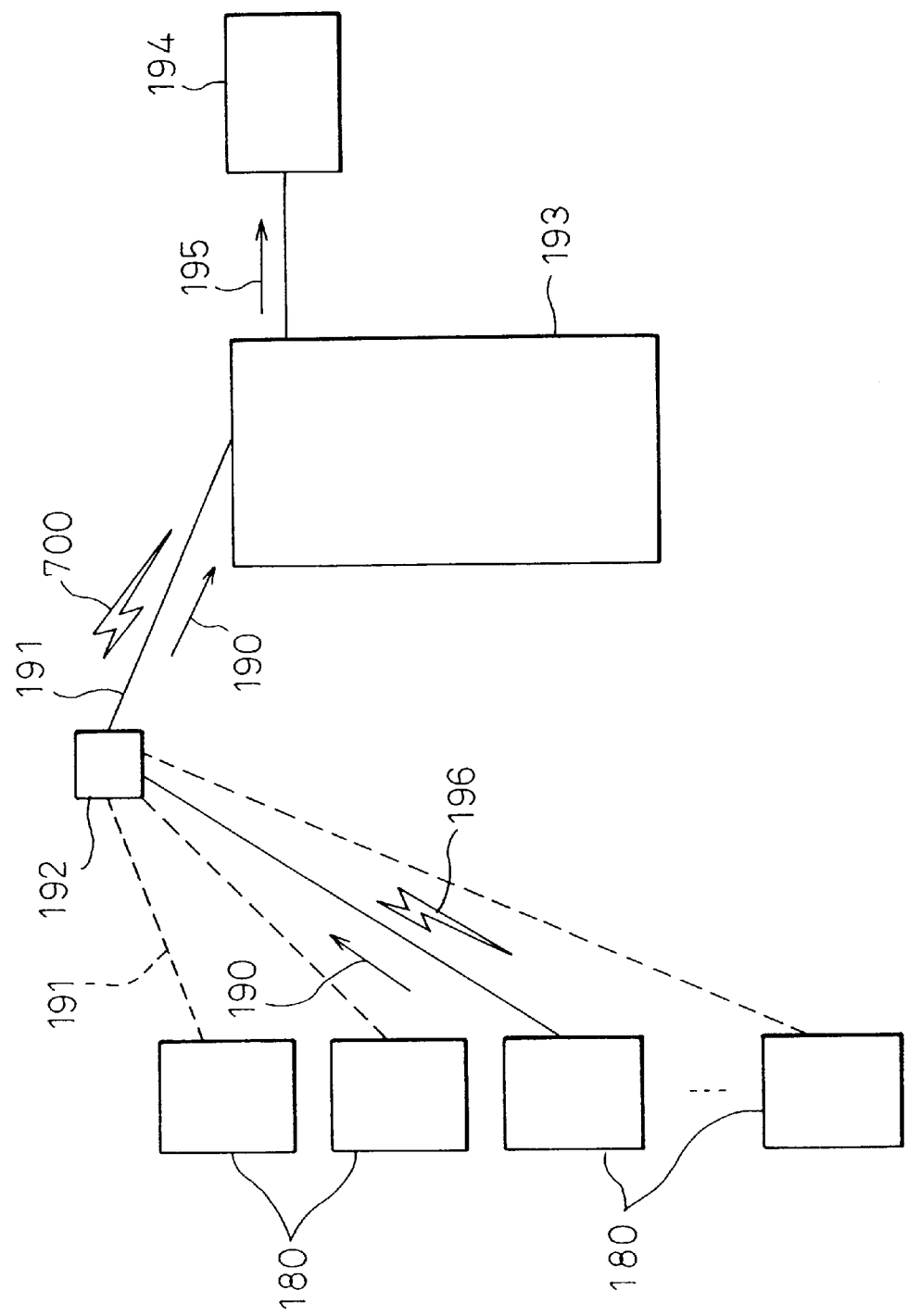

though a transmission-type hologram and dichromate gelatin are omitted from this description to keep it brief.

APPARATUS FOR SYNTHESIZING AND DISPLAYING IMAGES

BACKGROUND OF THE INVENTION

1. Field of the Invention

The present invention relates to an apparatus for synthesizing the image of a viewer and a second image into a synthesized image and displaying the synthesized image.

2. Description of the Related Art

There is an apparatus that images the face or body of a viewer, synthesizes the imaged image and a second image into a synthesized image, and displays the synthesized image. The apparatus synthesizes, for example, the face of a viewer and a hairstyle or clothes into a synthesized image and displays the synthesized image so that the viewer may see his own image with the hairstyle or clothes. This apparatus helps customers of barbershops or clothing stores make correct choices, thereby promoting the sales in the stores.

One problem of this apparatus is that the line of sight of the viewer watching the displayed image of its own does not agree with the line of sight of the displayed image because the camera that images the viewer is not in the line of sight of the viewer. As a result, the viewer has an unpleasant feeling when seeing his own image displayed on the apparatus.

To solve this problem, Japanese Unexamined Patent Publication No. 5-328336 discloses an apparatus employing a transparent hologram element. The hologram element reflects and diffracts light coming along the line of sight of a viewer, and a camera images the reflected and diffracted light the hologram element provides.

The hologram element of this disclosure, however, has a wavelength selectivity area to hinder faithful color imaging and correct color reproduction.

SUMMARY OF THE INVENTION

An object of the present invention is to provide an apparatus for synthesizing the image of a viewer and a second image into a synthesized image and displaying the synthesized image, capable of aligning the line of sight of the viewer with the line of sight of the displayed image of the viewer and reproducing correct colors on the synthesized image.

In order to accomplish the object, a first aspect of the present invention provides an apparatus for synthesizing the image of a viewer and a second image into a synthesized image and displaying the synthesized image. The apparatus has a transparent hologram screen on which a diffuser is recorded, an imaging unit for imaging the viewer through the hologram screen, a recording unit for recording images including the second image, a synthesizer for synthesizing the image of the viewer and the second image retrieved from the recording unit into the synthesized image, a projector for projecting signal light containing the synthesized image onto the hologram screen.

The first aspect is characterized in that it images the viewer from behind the transparent hologram screen. This makes the imaging unit freely positionable to image the viewer.

The imaging unit is positioned to align a line connecting a light entering point of the imaging unit to the vicinity of the eyes of the viewer with a line connecting the vicinity of the eyes of the viewer's image on the hologram screen to the vicinity of the eyes of the viewer. This makes the line of sight of the viewer agree with the line of sight of the viewer's image displayed on the hologram screen.

The synthesizer synthesizes the viewer's image and second image into the synthesized image, and the projector projects signal light containing the synthesized image onto the hologram screen. The displayed image is displayed with correctly reproduced colors and has a line of sight that agrees with the viewer's line of sight.

The recording unit stores many images which can be selectively combined with the image of a viewer.

The image of a viewer displayed according to the first aspect has a line of sight that agrees with a viewer's line of sight and has correctly reproduced colors.

The hologram screen of the first aspect may have a transmission-type hologram whose diffraction wavelength characteristics involve a wide range of selective wavelength band to provide diffracted images (displayed images) and transmitted images (imaged images) with correct colors. Namely, the image of a viewer provided by the imaging unit has correct colors, and an image reproduced and diffused on the hologram screen has correct colors.

A second aspect of the present invention provides an apparatus for synthesizing the image of a viewer and a second image into a synthesized image and displaying the synthesized image. The apparatus has a transparent hologram screen on which a diffuser is recorded, a background display unit arranged behind the viewer, for displaying a background image serving as the second image, an imaging unit for simultaneously imaging the viewer and background image through the hologram screen and providing the synthesized image, and a projector for projecting signal light containing the synthesized image onto the hologram screen.

The background display unit and imaging unit of the second aspect serve as the recording unit and synthesizer of the first aspect. Namely, the background display unit is arranged behind a viewer to display a background image, and the imaging unit images a combination of the viewer and background image through the hologram screen.

Then, the imaging unit provides a synthesized image of the viewer and a background image.

Other functions and effects of the second aspect are the same as those of the first aspect.

The background display unit displays a selected one of many background images so that a viewer may combine his own view with a desired one of the background images.

The hologram screen may have a transmission-type hologram.

The transmission-type hologram of the first and second aspects may be made of photopolymer or DCG (dichromate gelatin).

The apparatus of any one of the first and second aspects may have a rear shading unit for blocking external light travelling toward the back of the hologram screen.

The rear shading unit prevents external light from entering the hologram screen from behind the same, thereby securing the contrast and correctness of images displayed on the hologram screen.

The apparatus of any one of the first and second aspects may have a front shading unit for blocking external light travelling toward the front of the hologram screen.

The front shading unit prevents external light from entering the hologram screen from the front thereof, thereby securing the contrast and correctness of images displayed on the hologram screen.

A third aspect of the present invention provides an apparatus for synthesizing the image of a viewer and a second image into a synthesized image and displaying the synthesized image. The apparatus has a projector for projecting signal light containing the second image, a mirror arranged in front of the viewer, and a transmission-type hologram screen for diffracting and diffusing the signal light around a center angle that is different from an incident angle. The hologram screen and projector are arranged in front of the mirror so that the viewer may see a synthesis of the viewer's image and the second image.

The third aspect is characterized in that the hologram screen and projector are arranged in front of the mirror so that the viewer may see a synthesis of the viewer's image and the second image.

The second image emitted from the projector is diffracted by the hologram screen, passes through the same, is reflected by the mirror, and is seen by the viewer. At the same time, the image of the viewer is formed by the mirror and overlaps the second image. The overlapping images are seen by the viewer.

The transmission-type hologram screen has a wide range of selective wavelength band, and therefore, provides diffracted and transmitted images with correct colors. The viewer's image reflected by the mirror has a line of sight that agrees with a line of sight of the viewer who watches the viewer's image on the hologram screen.

In this way, the third aspect is capable of aligning the line of sight of the image of a viewer with the line of sight of the viewer. In addition, the third aspect is capable of reproducing correct colors on displayed images.

The apparatus of the third aspect may have a front shading unit for blocking external light coming toward the surface of the mirror (or a half-mirror).

The front shading unit prevents external light from transmitting or being diffracted by the hologram screen to disturb or deteriorate synthesized images on the hologram screen.

A fourth aspect of the present invention provides an apparatus for synthesizing the image of a viewer and a second image into a synthesized image and displaying the synthesized image. The apparatus has a projector for projecting signal light containing the second image, a half-mirror arranged in front of the viewer, and a transmission-type hologram screen for diffracting the signal light and diffusing the same around a center angle that is different from an incident angle. The hologram screen and projector are arranged in front of or behind the half-mirror, so that the viewer may see a synthesis of the viewer's image and the second image.

Instead of the mirror of the third aspect, the fourth aspect employs the half-mirror and arranges the hologram screen and projector in front of or behind the half-mirror.

The viewer simultaneously sees the second image transmitted through or reflected by the half-mirror as well as the viewer's image reflected by the half-mirror.

If the viewer and projector are placed in front of the hologram screen behind which the half-mirror is placed, the viewer sees the second image reflected by the half-mirror as well as the viewer's image reflected by the half-mirror. If the viewer is placed in front of the half-mirror behind which the hologram screen and projector are placed, the viewer sees the second image transmitted through the half-mirror as well as the viewer's image reflected by the half-mirror.

Other functions and effects of the fourth aspect are the same as those of the third aspect.

The fourth aspect may place first and second viewers on each side of the hologram screen. If the second viewer's side of the hologram screen is dimmed, the first and second viewers simultaneously see a combination of the first viewer's image and the second image. Namely, the image of the second viewer whose side is dimmed is invisible, and only the image of the first viewer whose side is bright is visible. Each of the first and second viewers sees a combination of the second image transmitted through or reflected by the half-mirror and the image of the first viewer transmitted through or reflected by the half-mirror.

More precisely, the first viewer whose side is bright sees the second image reflected by or transmitted through the half-mirror as well as the first viewer's image reflected by the half-mirror. At the same time, the second viewer whose side is dimmed sees the second image transmitted through or reflected by the half-mirror as well as the first viewer's image transmitted through the half-mirror.

The apparatus of the fourth aspect may have a rear shading unit for blocking external light directly entering the half-mirror. The rear shading unit prevents external light from disturbing images reflected by or transmitted through the half-mirror, thereby securing the contrast of the images.

BRIEF DESCRIPTION OF THE DRAWINGS

The above object and features of the present invention will be more apparent from the following description of the preferred embodiments when read in conjunction with the accompanying drawings wherein:

FIG. 1B shows an apparatus for synthesizing and displaying images according to another embodiment of the present invention;

FIG. 11 shows the behavior of light on a hologram screen and display screen of the apparatus of the prior art;

FIG. 13 shows a security system employing an apparatus for synthesizing and displaying images according to the present invention;

FIG. 17 shows a cash dispenser security system employing an apparatus for synthesizing and displaying images according to the present invention;

FIG. 19 shows a central control system for controlling automatic dispensers each provided with an apparatus for synthesizing and displaying images according to the present invention;

DESCRIPTION OF THE PREFERRED EMBODIMENTS

For a better understanding of the preferred embodiments of the present invention, an apparatus for synthesizing and displaying images according to a prior art and the problems thereof will be explained with reference to FIGS. 10 and 11.

Figure 10:
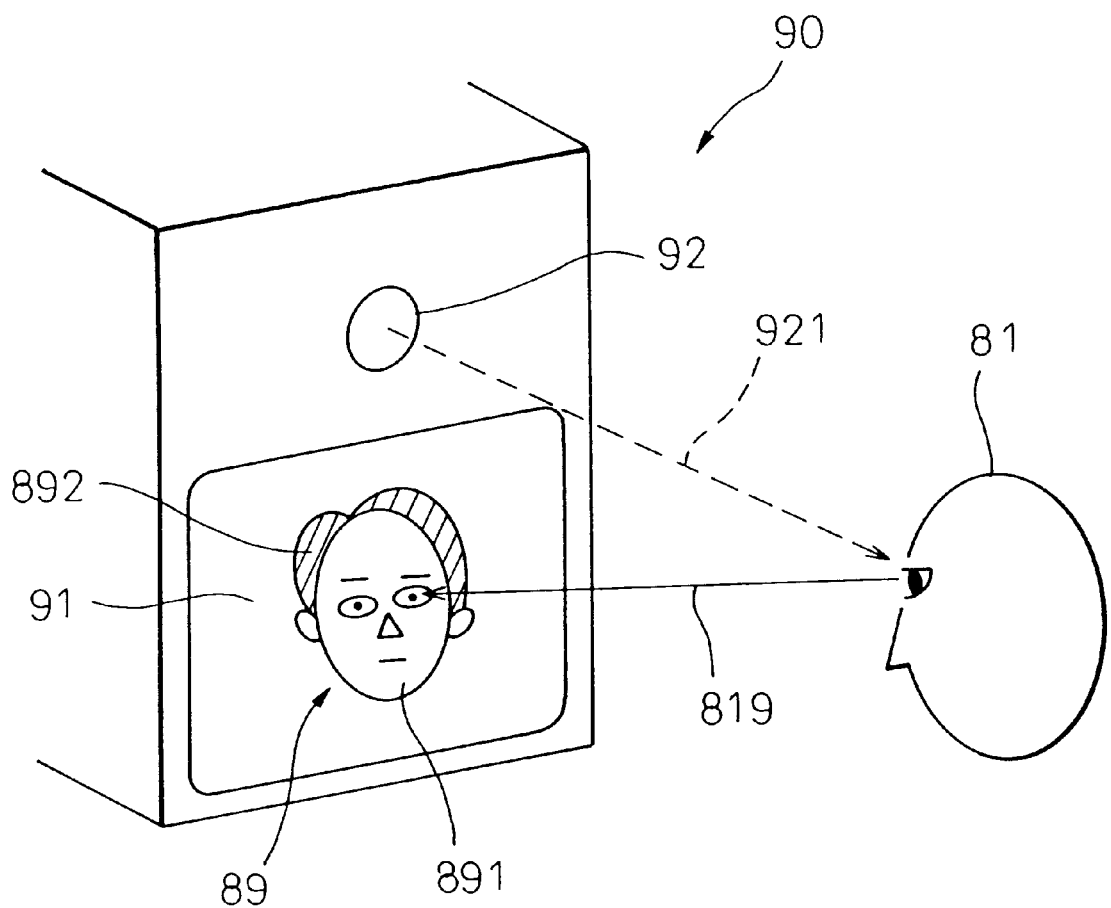
FIG. 10 shows an apparatus for synthesizing and displaying images according to a prior art.
Figure 12A:
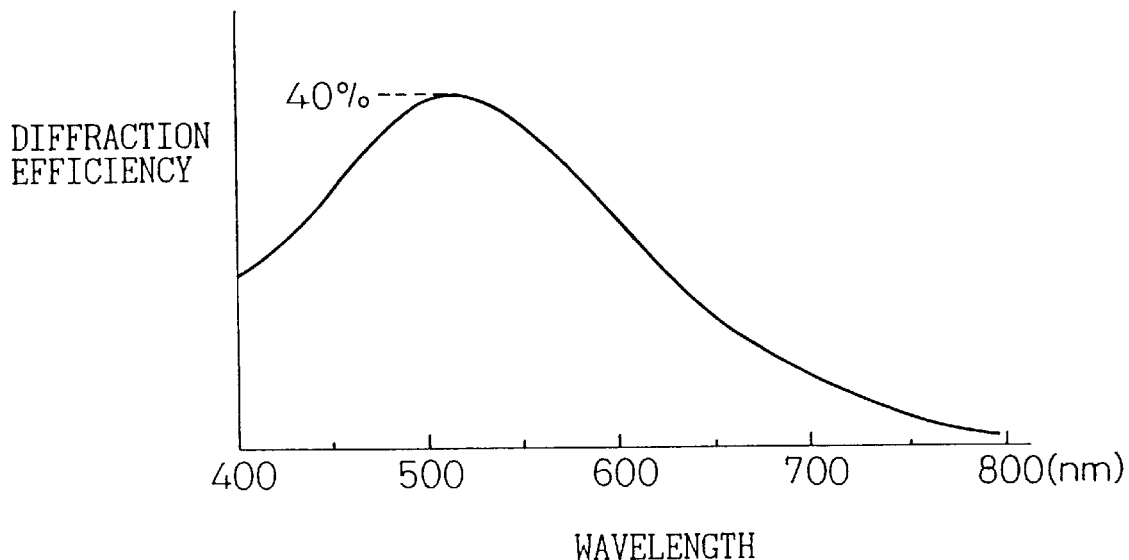
FIG. 12A shows the diffraction characteristics of a typical transmission-type hologram.
Figure 12B:
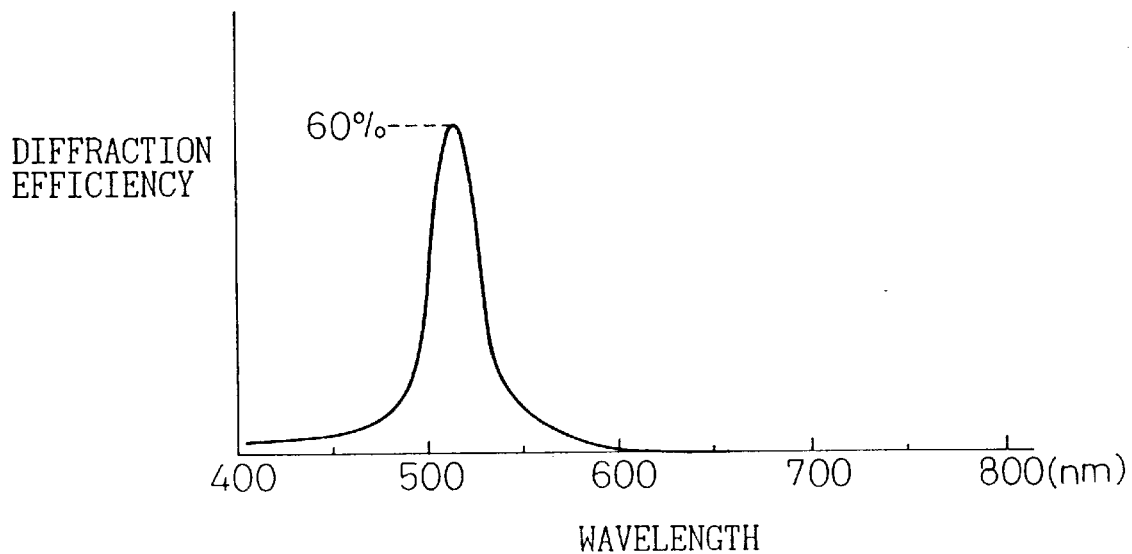
FIG. 12B shows the diffraction characteristics of a typical reflection-type hologram.

In FIG. 10, the apparatus 90 has a screen 91 and a camera 92. The camera 92 is arranged above the screen 91 and images a viewer 81. An imaged viewer's image 891 and a hairstyle image 892 retrieved from an image data source are synthesized into an image 89, which is displayed on the screen 91.

According to this prior art, a viewer's line of sight 819 is different from an imaging beam 921 of the camera 92. When the viewer 81 watches the viewer's image 891, the viewer 81 turns his eyes away from the camera 92. As a result, a line of sight of the viewer's image 891 disagrees with the line of sight 819 of the viewer 81. Then, the viewer 81 has an unpleasant feeling while viewing his own image 891 displayed on the screen 91.

To align the line of sight of the viewer's image 891 with the line of sight 819 of the viewer 81, Japanese Unexamined Patent Publication No. 5-328336 discloses an apparatus 9 of FIG. 11. The apparatus 9 has a hologram element 93 of good transmittance in front of a screen 91. Light 82 that travels along a line of sight 819 of a viewer 81 is reflected (diffracted) by the hologram element 93, and a camera 92 images the reflected (diffracted) light 821. This solves the viewer's 81 unpleasant feeling due to the disagreement of lines of sight.

More precisely, the hologram element 93 arranged in front of the screen 91 is of a reflection type. The light 82 traveling along a line that connects the vicinity of the eyes of the viewer 81 to the vicinity of the center of the screen 91 enters the camera 92 after being diffracted by the hologram element 93. This results in aligning the line of sight of the viewer 81 with the line of sight of a viewer's image 891 displayed on the screen 91.

The screen 91 emits display light 83. Part of the display light 83 passes through the hologram element 93, and the transmitted light 831 reaches to the viewer 81. The remaining part of the display light 83 is diffracted (reflected) by the hologram element 93, and the diffracted light 832 never reaches to the viewer 81.

However, the apparatus 9 of FIG. 11 has some problems.

The hologram element 93 has a wavelength selectivity area to hinder faithful color imaging or faithful color displaying. Namely, the camera 92 must image the diffracted light 821 from the hologram element 93, and the diffracted light 821 is colored in peculiar wavelengths because the diffraction efficiency of the hologram element 93 fluctuates depending on wavelengths. In addition, the viewer 81 must see the light 831 that is part of the display light 83 from which the diffracted light 832 has been removed. The light 831 is colored opposite to the light 821.

In order to solve the problems of the prior art, the present invention provides an apparatus for synthesizing and displaying images in such a way as to align the line of sight of a viewer with the line of sight of a viewer's image and reproduce the viewer's image with correct colors.

The preferred embodiments of the present invention will be explained.

Embodiment 1

Figure 1A:
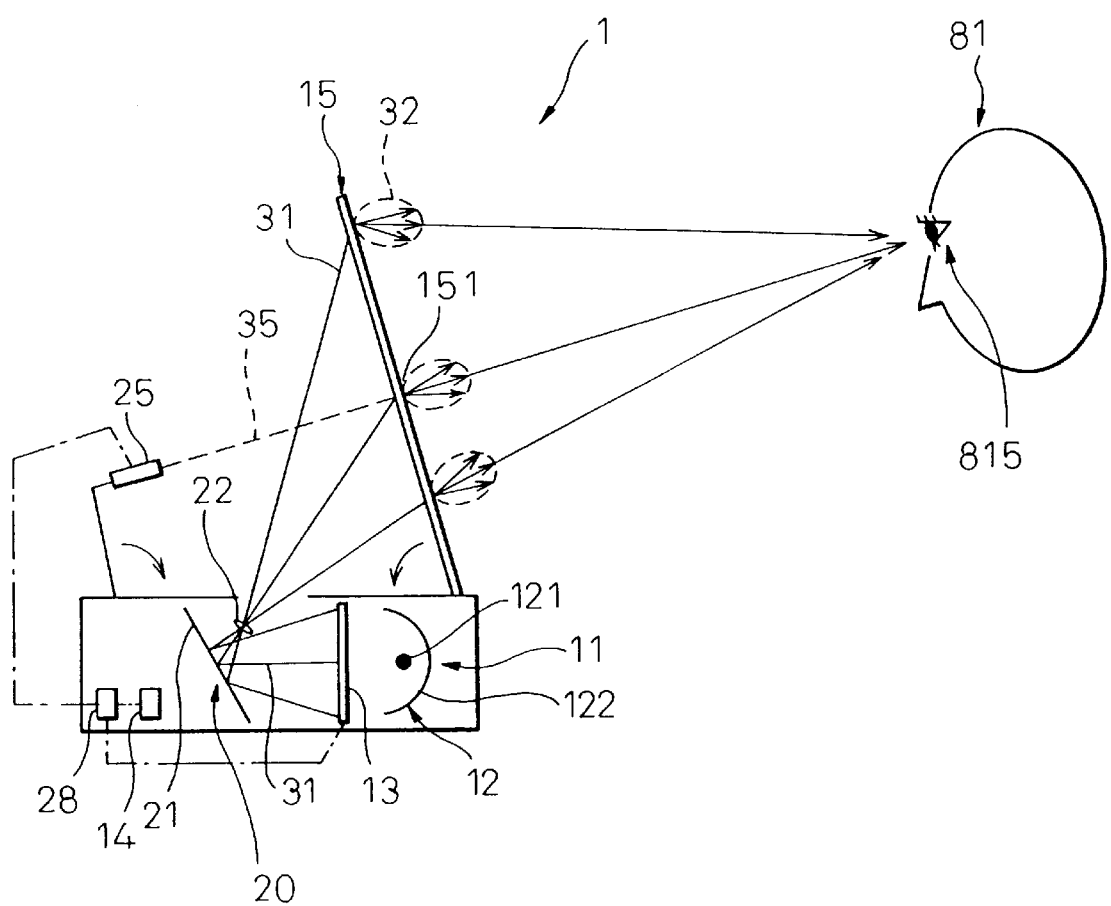
FIG. 1A shows an apparatus for synthesizing and displaying images according to a first embodiment of the present invention.
Figure 2:
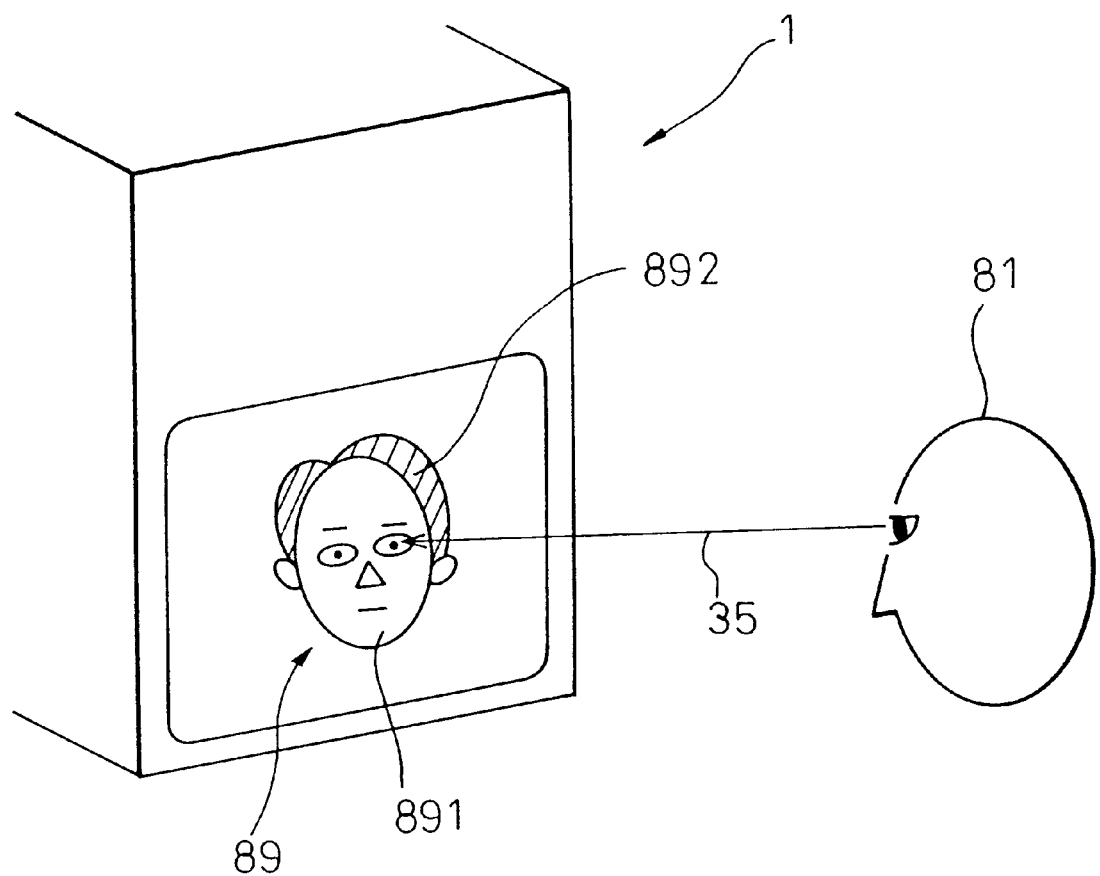
FIG. 2 shows a synthesized image displayed on the apparatus of the first embodiment.

FIGS. 1A and 2 show an apparatus 1 for synthesizing and displaying images according to an embodiment 1 of the present invention. The apparatus 1 synthesizes an image 891 of a viewer 81 and a second image such as a hairstyle image 892 into a synthesized image 89 and displays the synthesized image 89.

A transmission-type transparent hologram screen 15 has a diffuser recorded thereon. More precisely, interference fringes corresponding to the diffuser are recorded on the hologram screen 15. An electronic camera 25 images the viewer 81 through the hologram screen 15 and provides the viewer's image 891. A recording unit 14 stores images such as hairstyles. A synthesizer 28 receives a required image from the recording unit 14 and synthesizes the received image and the viewer's image 891 into the synthesized image 89. A projector 11 projects signal light 31 containing the synthesized image 89 onto the hologram screen 15.

Dot-and-dash lines in FIG. 1A represent electric wiring.

The camera 25 is arranged so that a line 35 connecting a light entering point of the camera 25 to the vicinity of eyes 815 of the viewer 81 agrees with a line connecting the center 151 of the viewer's image 891 to the vicinity of the eyes 815 of the viewer 81.

The hologram screen 15 is transparent and consists of a transmission-type hologram that is made of, for example, photopolymer.

The camera 25 images the viewer 81 through the hologram screen 15, converts the image data into digital electric signals, and sends the signals to the synthesizer 28. In response to a selection instruction, the recording unit 14 sends a hairstyle to the synthesizer 28.

The synthesizer 28 synthesizes the first image (viewer's image) and the second image (hairstyle) into the synthesized image 89.

The projector 11 projects the signal light 31 containing the synthesized image 89 onto the hologram screen 15. The projector 11 has a back-light unit 12 and an LCD (liquid crystal display) panel 13. The back-light unit 12 consists of a light source 121 and a reflector 122.

The LCD panel 13 is illuminated from behind and emits the signal light 31 containing the synthesized image 89 formed on the LCD panel 13. The synthesized image 89 is a combination of the viewer's image 891 and hairstyle 892.

The signal light 31 is reflected by a mirror 21 of an optical imaging system 20 and is passed through an imaging lens 22 to form an image on the hologram screen 15.

The hologram screen 15 has the recorded diffuser to provide diffused light 32 at an diffusion angle of the diffuser. Eventually, the synthesized image 89 is seen by the viewer 81 who is within the diffusion angle.

The transmission-type hologram of the screen 15 has a wide range of selective diffraction wavelengths to provide diffracted and transmitted images with correct colors.

Namely, images imaged by the camera 25 have correct colors, and images displayed on the hologram screen 15 also have correct colors.

Relationships between the incident angle of the signal light 31 and the diffraction characteristics of the hologram are adjusted so that the center angle of the diffused light 32 at which the intensity of the diffused light 32 is strongest is oriented toward the viewer 81.

Namely, the incident angle of the signal light incident on the hologram screen is adjusted to coincide with the incident angle of the reproducing light used in the hologram recording process.

According to the specific character of the hologram, the hologram screen 15 merely functions as a transparent screen with respect to light beams having incident angles that are different from the incident angle of the signal light 31. The light entering point of the camera 25 behind the hologram screen 15 is oriented toward the viewer 81 to image the viewer 81 along a line of sight of the viewer 81 through the hologram screen 15.

Although the viewer 81 may observe the background behind the hologram screen 15 through the same, images displayed on the screen 15 are far brighter than the background. The viewer 81, therefore, sees the displayed images alone.

Compared with the prior art of FIG. 10, the embodiment 1 is capable of easily aligning the imaging direction 35 of the camera 25 with the line of sight of the viewer 81. As a result, the line of sight of the viewer 81 agrees with the line of sight of the viewer's image 891, so that the viewer 81 has no unpleasant feeling on viewing his own image.

Since the camera 25 is arranged behind the screen 15, the apparatus 1 needs a small space on the viewer's side, and the viewer 81 receives no oppressive feeling from the camera 25.

The hologram screen 15 and camera 25 may be structured so as to incline and be folded in the direction of arrow marks of FIG. 1A. Then, the screen 15 and camera 25 are folded into a compact shape when the apparatus 1 is not used. Alternatively, the camera 25 may be arranged beside the mirror 21 so that they are accommodated in a casing as shown in FIG. 1B. In this case, the line of sight of the viewer 81 slightly deviates from the line of sight of the viewer's image 891. The hologram screen 15 and camera 25 may be arranged behind the mirror 21 so that they are all received in a casing.

Figure 3:
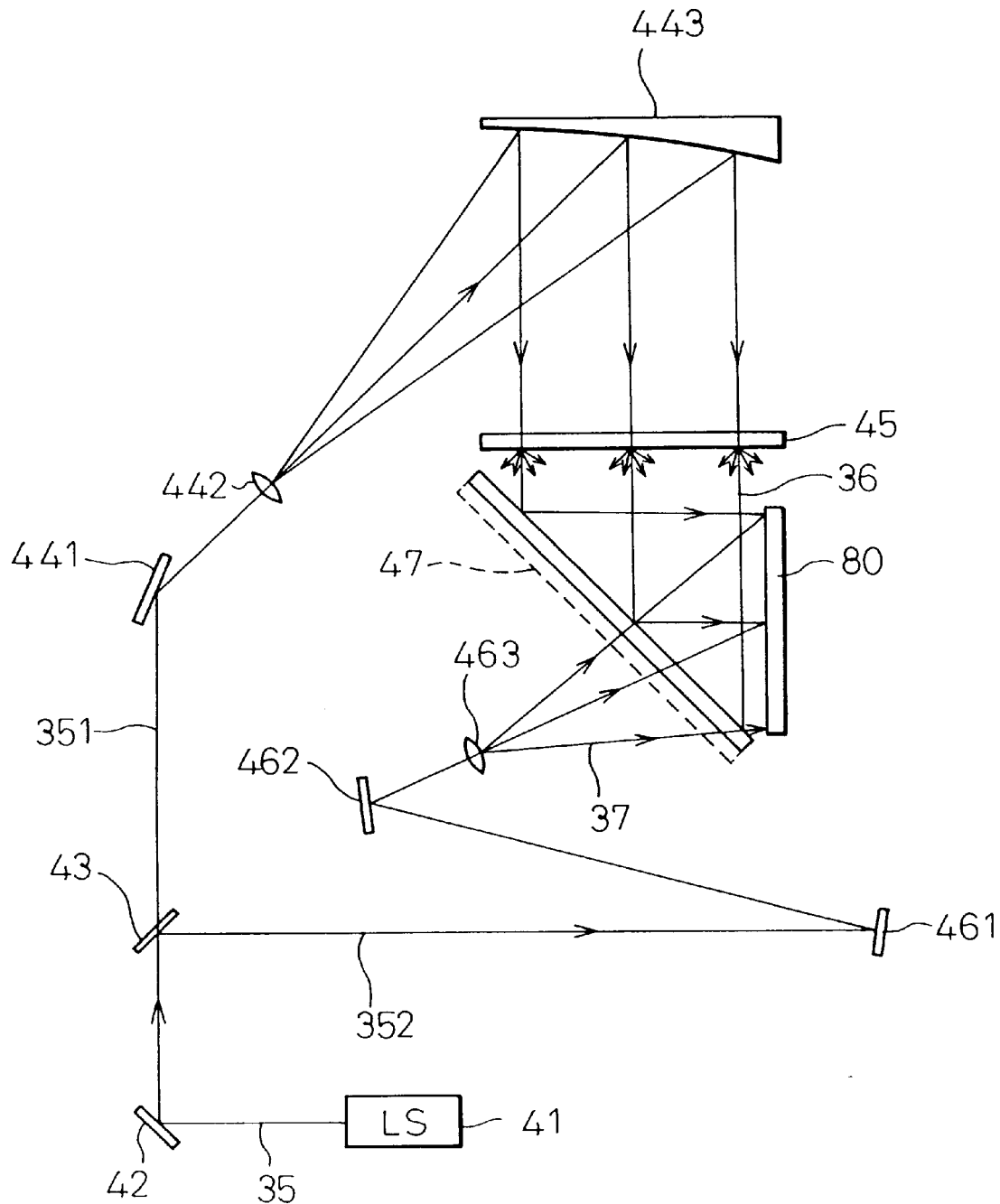
FIG. 3 shows a system for exposing a hologram according to the first embodiment.

FIG. 3 shows a way of exposing a hologram for the hologram screen 15.

A laser source 41 emits a coherent beam 40, which is changed in direction by a mirror 42 and is divided by a half-mirror 43 into beams 351 and 352. The beam 351 is handled by a mirror 441, an object lens 442, and an off-axis parabolic mirror 443 that provides a parallel beam. The parallel beam is passed through a diffuser 45 to form an object beam 36, which is reflected by a half-mirror 47 and irradiates a photosensitive material 80.

The other beam 352 from the half-mirror 43 is handled by mirrors 461 and 462 and an object lens 463, which forms a divergent beam. The divergent beam is passed through the half-mirror 47 to form a reference beam 37, which irradiates the photosensitive material 80. The photosensitive material 80 irradiated with the object beam 36 and reference beam 37 provides the diffuser-recorded, transmission-type hologram, which forms the hologram screen 15. When the hologram screen 15 is irradiated with regenerative light that travels in the direction of the reference beam 37, the hologram screen 15 diffracts and transmits the light and provides outgoing light. This outgoing light is the equivalent of diffused light provided by the diffuser 45.

In this way, the apparatus 1 of the embodiment 1 is capable of aligning the line of sight of the viewer 81 with the line of sight of the viewer's image 891 and reproducing correct colors on the synthesized image 89.

Embodiment 2

Figure 4:
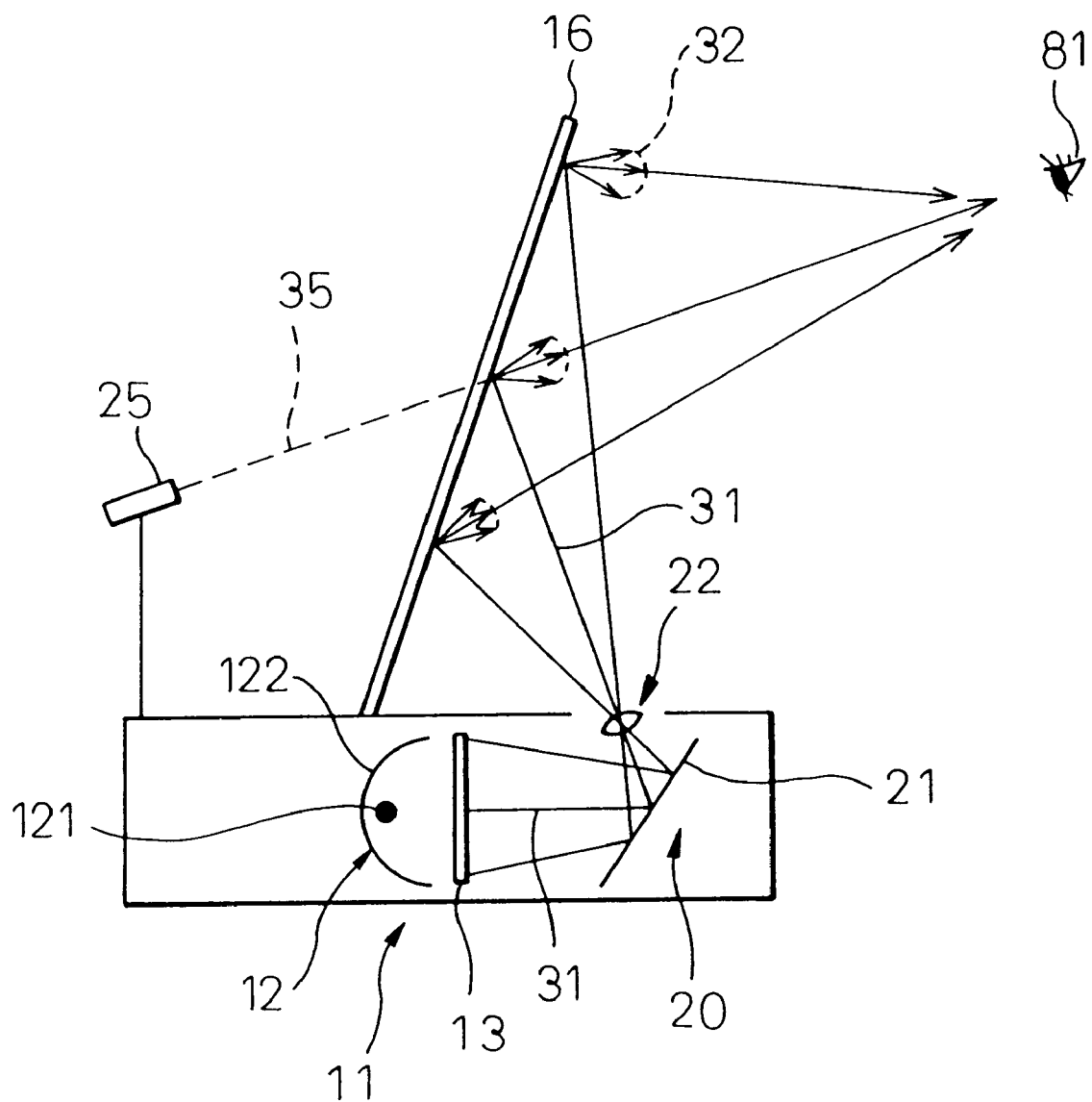
FIG. 4 shows an apparatus for synthesizing and displaying images according to a second embodiment of the present invention.

FIG. 4 shows an apparatus for synthesizing and displaying images according to an embodiment 2 of the present invention. This apparatus employs a reflection-type hologram screen 16. Signal light 31 is made incident to the hologram screen 16 from the front side thereof, and diffracted and reflected light (diffused light 32) is seen by a viewer 81.

A display unit 11 and an optical imaging system 20 are arranged opposite to those of the embodiment 1 of FIG. 1.

A system for exposing the hologram screen 16 has an opposite arrangement of the system of FIG. 3. Namely, the object beam 36 and reference beam 37 of FIG. 3 are made incident to the photosensitive material 80 from the opposite sides thereof.

Since the hologram screen 16 is of a reflection-type, the color reproducibility thereof is inferior to that of the embodiment 1. The embodiment 2 properly arranges half-mirrors to obtain required light paths.

Other functions and effects of the embodiment 2 are the same as those of the embodiment 1.

Embodiment 3

Figure 5:
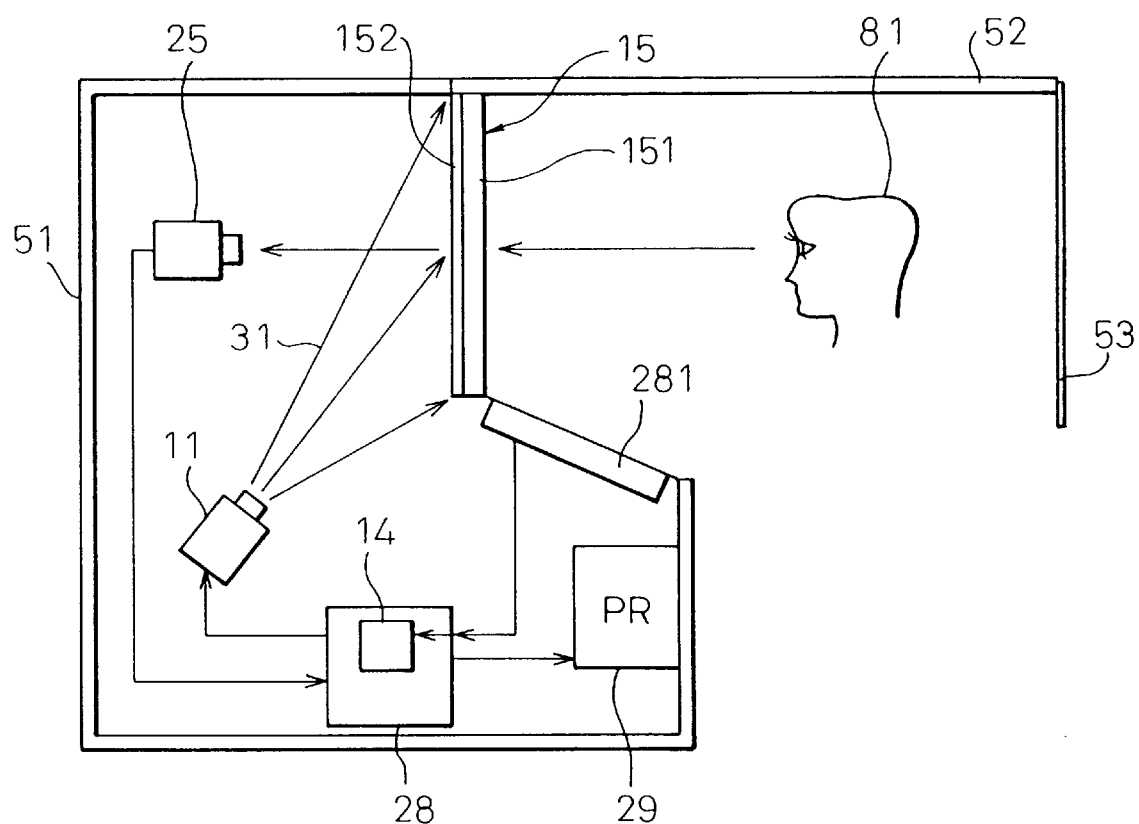
FIG. 5 shows an apparatus for synthesizing and displaying images according to a third embodiment of the present invention.

FIG. 5 shows an apparatus for synthesizing and displaying images according to an embodiment 3 of the present invention. The apparatus employs a casing 51 serving as a rear shading unit for blocking external light entering the back of a hologram screen 15. The apparatus also has a hood 52 and shading film 53 to form a front shading unit to block external light entering the front side of the hologram screen 15.

The hologram screen 15 consists of a transparent glass plate 151 to which a transmission-type hologram 152 is attached. The hologram 152 is made of a photopolymer film on which a diffuser is recorded. An electronic camera 25 images a viewer 81 and transmits an imaged image to a synthesizer 28.

The viewer 81 manipulates a switch 281 to select a second image to be combined with the viewer's image. The selected second image 892 is transferred to the synthesizer 28, which synthesizes the viewer's image 891 and the selected image 892 into a synthesized image. A projector 11 projects the synthesized image onto the hologram screen 15.

If an instruction is issued, the synthesized image may be printed on a color printer 29.

The camera 25 and projector 11 are installed in the casing 51, which shades the surroundings of the camera 25 and the back of the hologram screen 15, to secure the contrast and visibility of the synthesized image 89 displayed on the hologram screen 15.

The hood 52 extends oppositely to the projector 11, to cover the hologram screen 15. The hood 52 blocks noise light such as illumination light entering the screen 15, thereby securing the stability of the displayed image 89.

The shading film 53 is arranged behind the viewer 81, to further block the external light. When the camera 25 images the viewer 81, the shading film 53 provides a uniform background to improve the contrast of the image of the viewer 81.

The hood 52 prevents a leakage of zero-order diffracted light (transmitting light with no diffraction) produced from the signal light 31 of the projector 11 and emitted from the hologram screen 15.

Other functions and effects of the embodiment 3 are the same as those of the embodiment 1.

Embodiment 4

Figure 6:
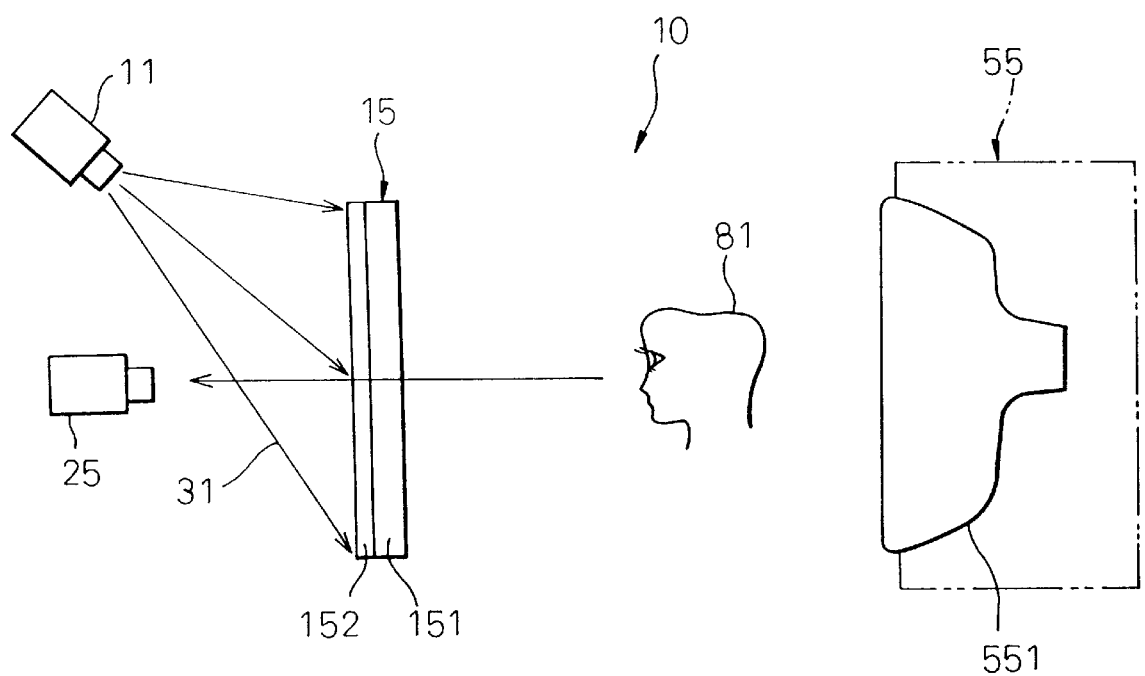
FIG. 6 shows an apparatus for synthesizing and displaying images according to a fourth embodiment of the present invention.

FIG. 6 shows an apparatus 10 for simultaneously displaying the image of a viewer 81 and a second image. The apparatus has a transmission-type transparent hologram screen 15 on which a diffuser is recorded. A display unit 55 is arranged behind the viewer 81. The display unit 55 has a CRT 551 to display a background serving as a second image. An electronic camera 25 simultaneously images, through the hologram screen 15, the viewer 81 and the background displayed on the CRT 551. A projector 11 projects signal light 31 containing the image imaged by the camera 25 on the hologram screen 15.

The apparatus 10 has no synthesizer 28 of the embodiment 1, to provide the effect of the embodiment 1. Since the embodiment 4 uses no electric image synthesis by the synthesizer 28, the apparatus 10 realizes high-speed image processing and is useful for synthesizing moving pictures.

For example, the apparatus 10 is suitable for a virtual game machine with which the viewer 81 participates in a virtual game.

Other functions and effects of the embodiment 4 are the same as those of the embodiment 1.

Embodiment 5

Figure 7:
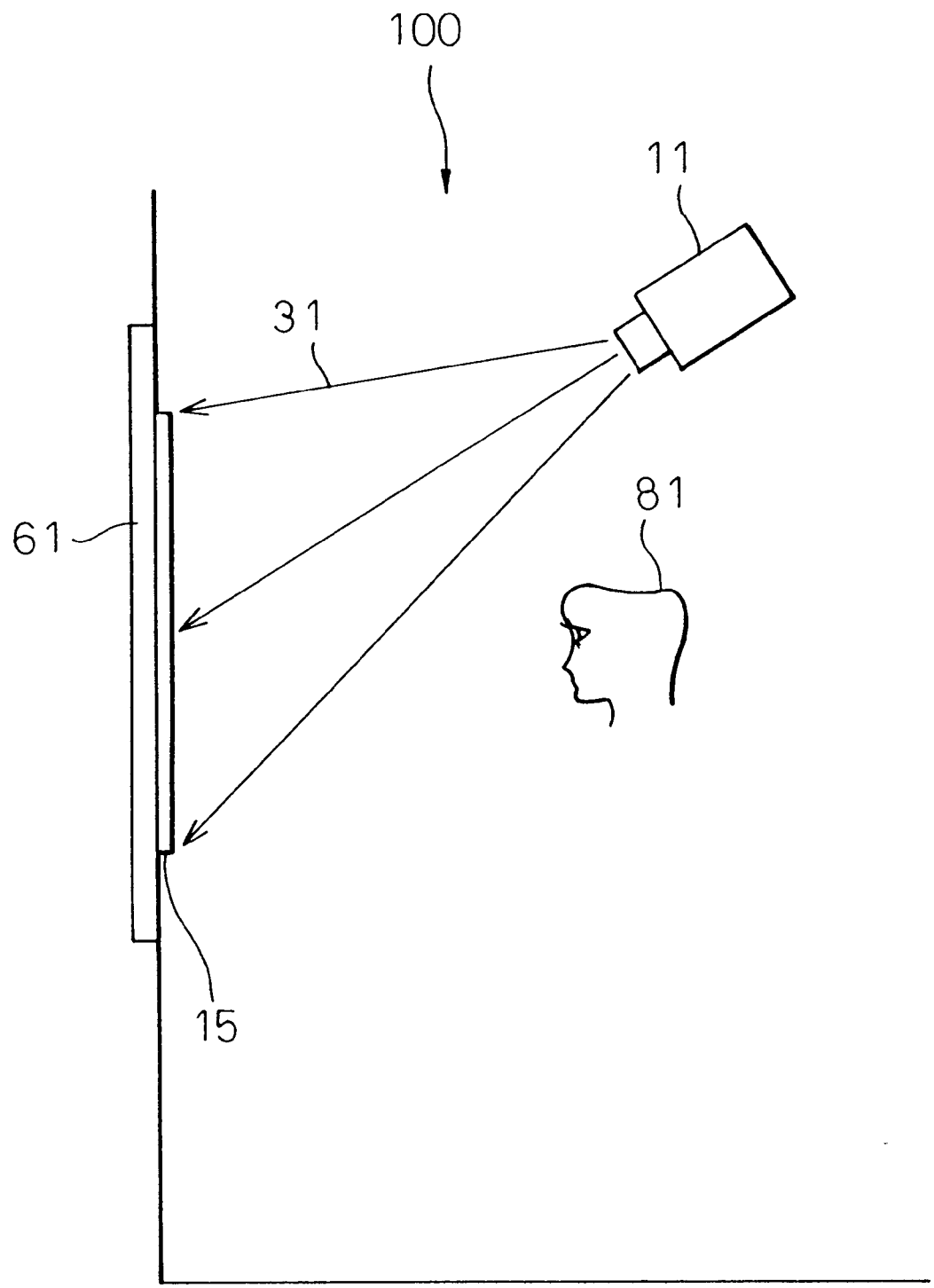
FIG. 7 shows an apparatus for synthesizing and displaying images according to a fifth embodiment of the present invention.

FIG. 7 shows an apparatus 100 for synthesizing the image of a viewer 81 and a second image into a synthesized image and displaying the synthesized image. The apparatus 100 has a projector 11 for emitting signal light 31 containing the second image. A mirror 61 is arranged in front of the viewer 81. A transmission-type hologram screen 15 (FIG. 8) diffracts the signal light 31 and diffuses diffracted light 32 around a center angle that is different from an incident angle. The hologram screen 15 and projector 11 are arranged in front of the mirror 61 so that the viewer 81 may see both the second image projected by the projector 11 and the mirror image of the viewer 81 regularly reflected by the mirror 61.

Figure 8:
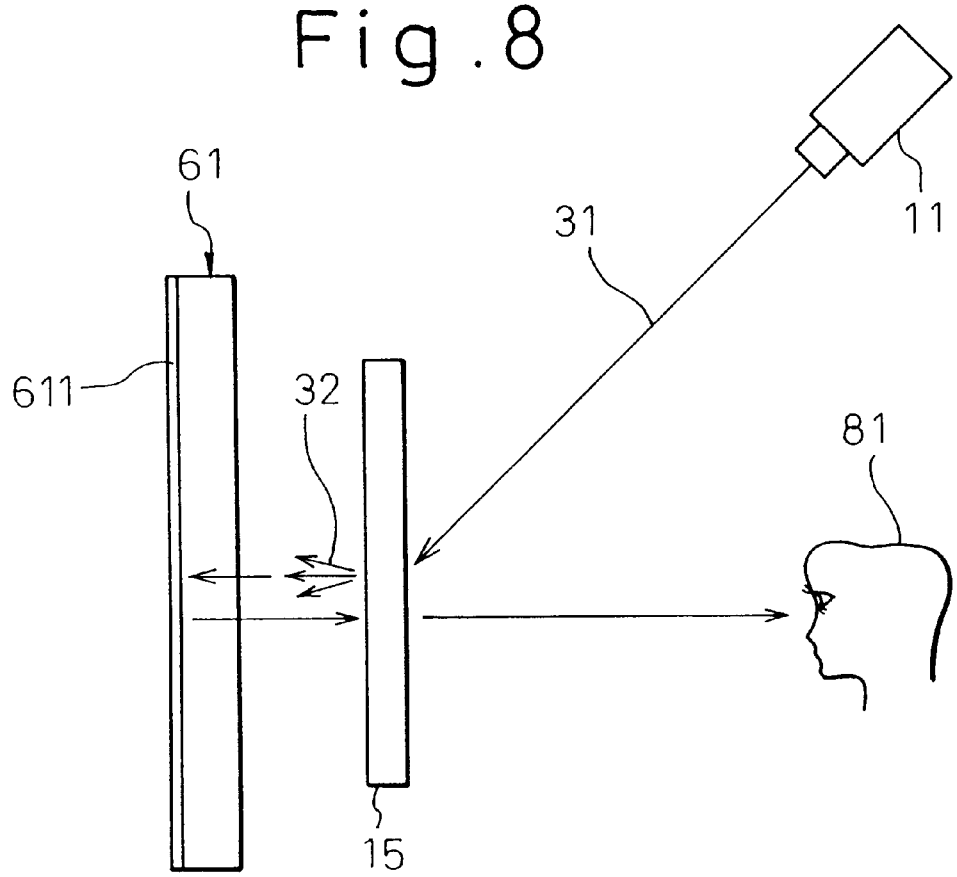
FIG. 8 shows the behavior of light on a hologram screen and mirror of the apparatus of the fifth embodiment.

Since the viewer 81 sees the image of its own reflected by the mirror 61, the camera 25 of any one of the embodiments 1 to 4 is not needed. In FIG. 8, the signal light 31 from the projector 11 onto the screen 15 is diffracted by a transmission-type hologram recorded on the screen 15, and the diffracted light 32 advances toward the mirror 61. The diffracted light 32 is then regularly reflected by the mirror 61 and enters the screen 15 at a non-diffraction angle. The light passes through the transparent screen 15 and reaches to the viewer 81. The mirror 61 has a reflection face 611.

Although the hologram screen 15 is of the transmission type having good color reproducibility, the screen 15 serves as a reflection-type hologram screen to reflect the signal light 31, due to the mirror 61. This results in allowing the projector 11 to be installed on the viewer's side. This arrangement is useful for, for example, a barbershop where there is only a limited space behind the screen 15.

Other functions and effects of the embodiment 5 are the same as those of the embodiment 1.

Embodiment 6

Figure 9:
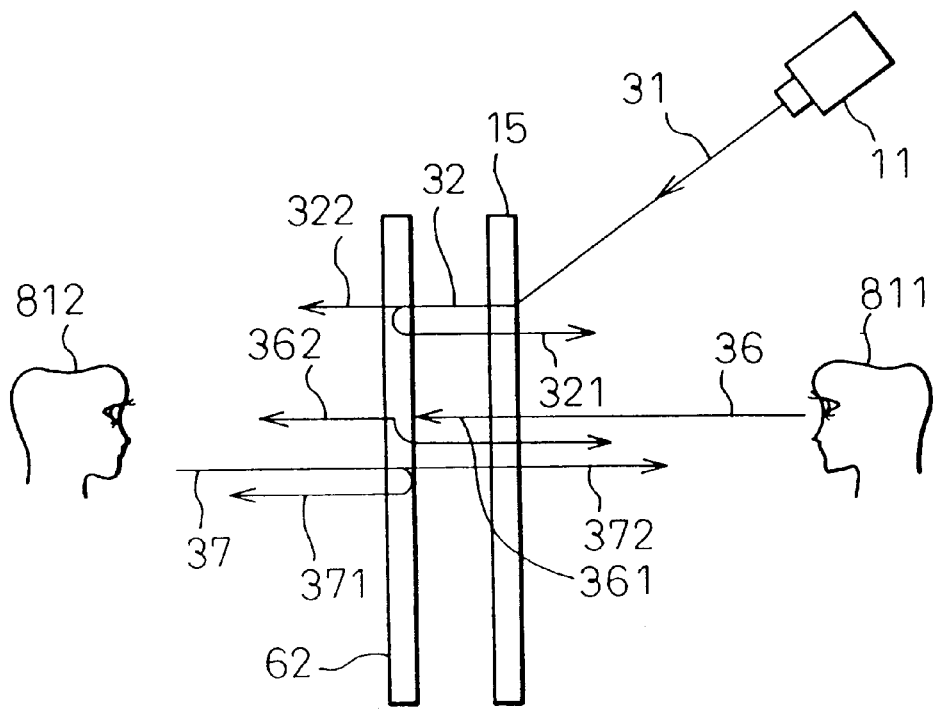
FIG. 9 shows an apparatus for synthesizing and displaying images according to a sixth embodiment of the present invention, as well as the behavior of light on a hologram screen and half-mirror of the apparatus.

FIG. 9 shows an apparatus for synthesizing and displaying images according to an embodiment 6 of the present invention. This embodiment employs a half-mirror 62 instead of the mirror 61 of the embodiment 5.

A projector 11 emits signal light 31, which is diffracted by a transmission-type hologram screen 15. Part 321 of the diffracted light 32 is reflected by the half-mirror 62, while the other part 322 of the diffracted light 32 passes through the half-mirror 62.

A first viewer 811 is on the projector side, and a second viewer 812 is on the opposite side. Each of the viewers 811 and 812 can see an image contained in the signal light 31.

Light beams 36 and 37 contain the images of the viewers 811 and 812, respectively. The beams 36 and 37 are reflected by and passes through the half-mirror 62 to form reflected beams 361 and 371 and transmitted beams 362 and 372. Accordingly, each of the viewers 811 and 812 can see the image contained in the signal light 31 as well as the images of the viewers 811 and 812.

If one side of the hologram screen 15 is shaded, the image of the viewer on the shaded side will be invisible. Then, each of the viewers 811 and 812 sees the image contained in the signal light 31 as well as the image of the viewer on the bright side.

Other functions and effects of the embodiment 6 are the same as those of the embodiment 5.

Embodiment 7

Figure 14:
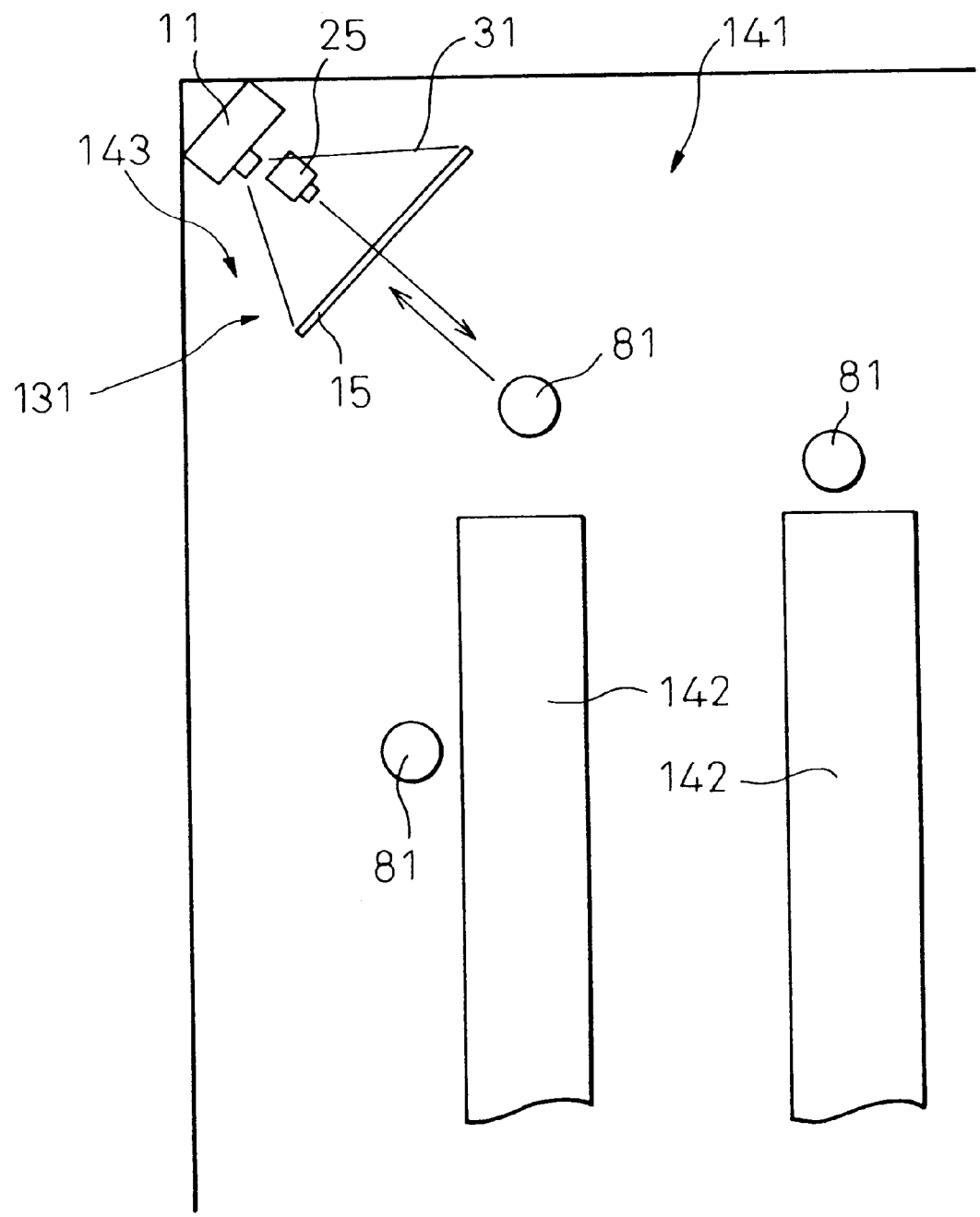
FIG. 14 is a plan view showing a store with the security system of FIG. 13.
Figure 15:
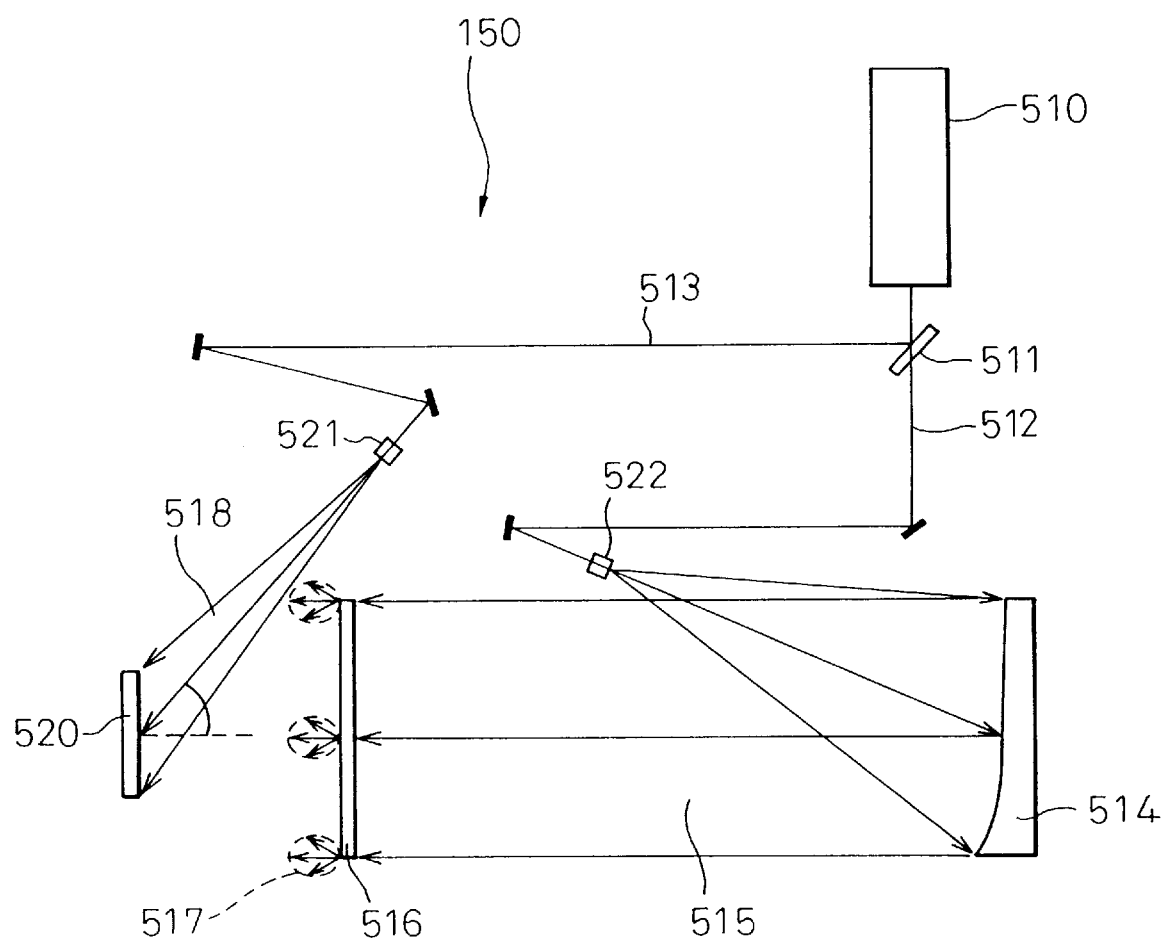
FIG. 15 shows an optical system for exposing a transmission-type hologram for the security system of FIG. 13.

FIGS. 13 to 15 show a security system employing an apparatus for synthesizing and displaying images according to the present invention.

The security system 131 has a hologram screen 15 and a projector 11 for projecting signal light 31 onto the hologram screen 15. The hologram screen 15 has a surface 134 to display an image 132. A monitor 25 is arranged at the back 133 of the hologram screen 15.

FIG. 14 shows a store 141 having commodity shelves 142. Customers 81 move between the shelves 142 and select commodities. The shop 141 has a corner 143 where the security system 131 is installed to monitor the shelves 142.

The hologram screen 15, projector 11, and monitor 25 are attached to arms 137 that are fixed to the ceiling 135.

The projector 11 may be a liquid crystal projector such as Matsushita liquid crystal projector TH-L392J. An image supply unit 136 is installed behind the ceiling 135, to supply images to the projector 11 through a transmission cable. The image supply unit 136 may be an LD player.

The monitor 25 may be a standard monitoring camera used for supermarkets and convenience stores. Monitored images from the monitor 25 are supplied to a checkout counter in the store 141 so that a clerk at the counter may monitor the conditions of commodities on the shelves 142.

The hologram screen 15 is a transmission-type hologram screen consisting of a transparent substrate to which a transmission-type hologram element is attached. The principle of the transmission-type hologram screen will briefly be explained.

At the back 133 of the hologram screen 15, the projector 11 projects image light 31. The image light 31 forms an image 132 on the hologram screen 15 so that the customers 81 may see the image 132.

The transmission-type hologram element is prepared by an optical exposing system 150 of FIG. 15.

A laser oscillator 510 emits a laser beam, which is divided by a beam splitter 511 into beams 512 and 513.

The beam 512 passes through an object lens 522 to provide a divergent beam. The divergent beam is made incident to an off-axis parabolic mirror 514 to provide a parallel beam 515. The parallel beam 515 passes through a diffuser 516 such as ground glass to provide an object beam 517. The other beam 513 is diverged by an object lens 521 to provide a reference beam 518.

The object beam 517 and reference beam 518 are made incident to a photosensitive material 520, which records interference fringes produced by the beams 517 and 518.

The photosensitive material 520 on which the diffuser 516 is recorded forms a hologram element.

When image light is projected onto the hologram element, the hologram element diffracts and diffuses the image light, as if the image light is projected onto the diffuser 516. Accordingly, the hologram element serves as an opaque screen. The photosensitive material 520 of the hologram element may be made of transparent material such as photopolymer or gelatin to provide the hologram element with high transmittance.

The operation of the embodiment 7 will be explained.

The monitor 25 is arranged at the back 133 of the hologram screen 15 on which the image light 31 is projected.

The image light 31 forms the image 132 on the hologram screen 15. The customers 81 in front of the security system 131 see only the image 132 and never see the monitor 25 behind the screen 15.

The transmittance of the hologram screen 15 is very high, such as 70% to 80% to make the back 133 of the hologram screen 15 sufficiently bright. As a result, the monitor 25 properly monitors the shelves 142 with light that passes through the hologram screen 15. Namely, the monitor 25 can provide clear images of the shelves 142.

On the other hand, the customers 81 see the security system 131 as a simple display unit that displays the image 132. Namely, the customers 81 hardly notice that they are monitored, and therefore, the security system 131 never provides the customers 81 with psychological pressure.

In this way, the security system of the embodiment 7 is capable of surely monitoring objects without letting customers notice it.

Embodiment 8

Figure 16:
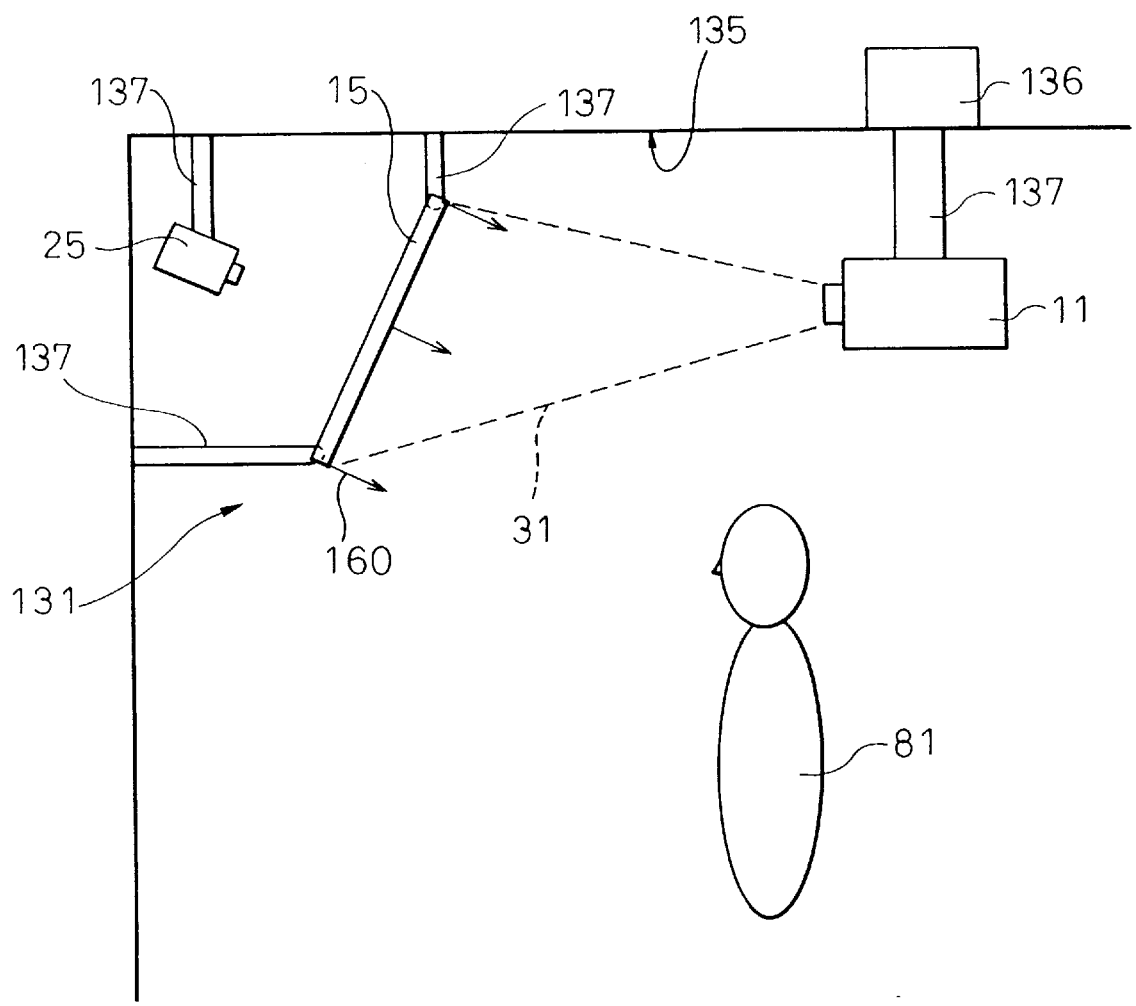
FIG. 16 shows a security system employing a reflection-type hologram screen according to the present invention.

FIG. 16 shows a security system employing a reflection-type hologram screen according to an embodiment 8 of the present invention.

The security system 131 has a monitor 25, the hologram screen 15, and a projector 11, which are attached to arms 137 fixed to the ceiling 135 at a corner of a store. They are arranged in order of, from the corner of the store, the monitor 25, hologram screen 15, and projector 11.

Similar to the embodiment 7, an image supply unit 136 is installed behind the ceiling 135, to supply images to the projector 11 through a transmission cable. The projector 11 may be a liquid crystal projector such as Matsushita liquid crystal projector TH-L392J.

The hologram screen 15 is of a reflection type.

Unlike the transmission-type hologram screen that is prepared by exposing the same side of a photosensitive material to object and reference beams, the reflection-type hologram screen is prepared by exposing the opposite sides of a photosensitive material to object and reference beams, respectively. Accordingly, the reflection-type hologram screen must receive image light in a direction opposite to that of the transmission-type hologram screen. This is why the embodiment 8 projects image light 31 onto the surface of the hologram screen 15 to display images.

Other functions and effects of the embodiment 8 are the same as those of the embodiment 7.

The embodiment 8 arranges the projector 11 and monitor 25 on the opposite sides of the hologram screen 15, and therefore, the security system 131 of the embodiment 8 needs a small space at a corner of a store, to provide the same effects as the embodiment 7.

Embodiment 9

FIG. 17 shows a cash dispenser employing a security system according to the present invention.

The cash dispenser 170 has a main body 171 and a touch panel 172. A hologram screen 15 of the security system 131 is arranged on the back of the touch panel 172.

The main body 171 includes controllers, etc., to realize cash dispensing functions such as cash depositing and drawing functions.

The hologram screen 15 displays a menu, and the touch panel 172 senses a point where a viewer 81 touches. Namely, the screen 15 and touch panel 172 act as a menu selector for the cash dispenser 170.

The menu may be a graphical menu including characters and icons representing the cash dispensing functions.

It is preferable that the view angle of the hologram screen 15 is narrow because it must display a personal identification number and amount of money. Only a viewer within the view angle can see information displayed on the hologram screen 15.

The security system 131 has a projector 11 and a monitor 25, which are arranged behind a back wall 173 that is installed behind the cash dispenser 170. The projector 11 projects image light 31 onto the hologram screen 15 through a window 174 formed on the wall 173.

The floor 174 in front of the cash dispenser 170 incorporates a pressure sensor 175 to detect whether or not any customer 81 is in front of the cash dispenser 170. The pressure sensor 175 sends a signal to a controller 176.

Other arrangements and functions of the embodiment 9 are the same as those of the embodiment 8.

The operation of the cash dispenser 170 will be explained.

If the pressure sensor 175 senses that there is no weight thereon, the controller 176 determines that there is no customer in front of the cash dispenser 170 and instructs the projector 11 to project standard images.

Then, the projector 11 projects image light 31 onto the hologram screen 15 to display the standard images such as commercial messages.

These standard images conceal the monitor 25 from persons around the cash dispenser 170.

When a customer 81 stands on the pressure sensor 175 in front of the cash dispenser 170, the pressure sensor 175 sends a detection signal to the controller 176. The controller 176 instructs the projector 11 to switch the image light 31 to the menu. Then, the menu is displayed on the hologram screen 15.

When the customer 81 touches the menu, the touch panel 172 detects the point where the customer 81 has touched. The detected signal is sent to the cash dispenser function controllers to respond to the request of the customer 81.

When the customer 81 moves away from the cash dispenser 170, the pressure sensor 175 sends a corresponding signal to the controller 176. The controller 176 instructs the projector 11 to switch the menu to the image light 31. The projector 11 follows the instruction, to display the standard images on the hologram screen 15.

The monitor 25 behind the hologram screen 15 always images scenes in front of the hologram screen 15 and sends the imaged scenes to a receiver installed in a security room so that a guard may monitor the situations of the cash dispenser 170 and customer 81.

The monitor 25 is completely concealed from the customer 81 and persons around the cash dispenser 170, and therefore, is capable of monitoring the cash dispenser 170 without giving the customer 81 an unfavorable impression. The monitor 25 can be installed right in front of the customer 81 to closely image the customer 81 and easily and clearly identify the customer 81.

A combination of the hologram screen 15 and projector 11 provides full-color moving pictures to improve the appearance of the cash dispenser 170.

Other functions and effects of the embodiment 9 are the same as those of the embodiment 7.

Embodiment 10

Figure 18A:
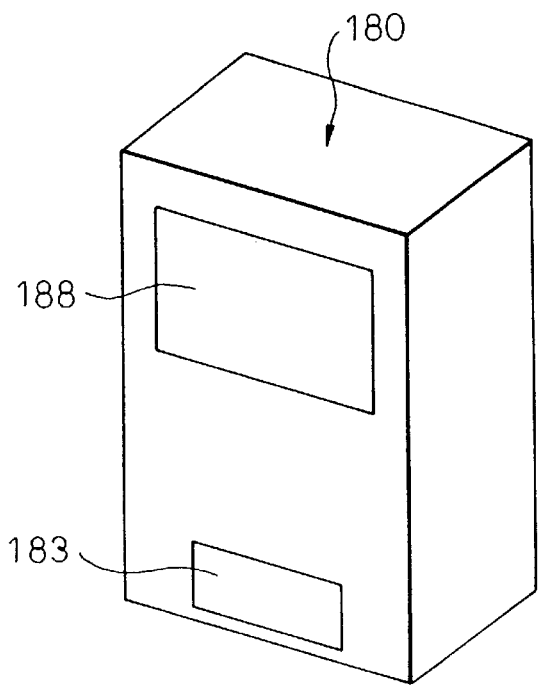
FIGS. 18A and 18B show an automatic dispenser security system employing an apparatus for synthesizing and displaying images according to the present invention.
Figure 18B:
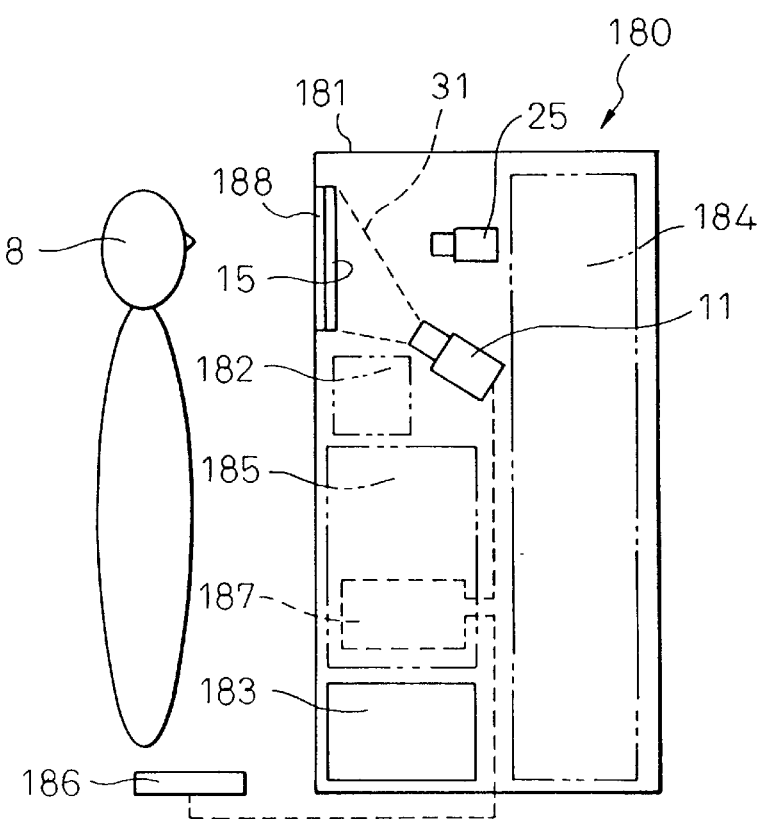
Figure 20:
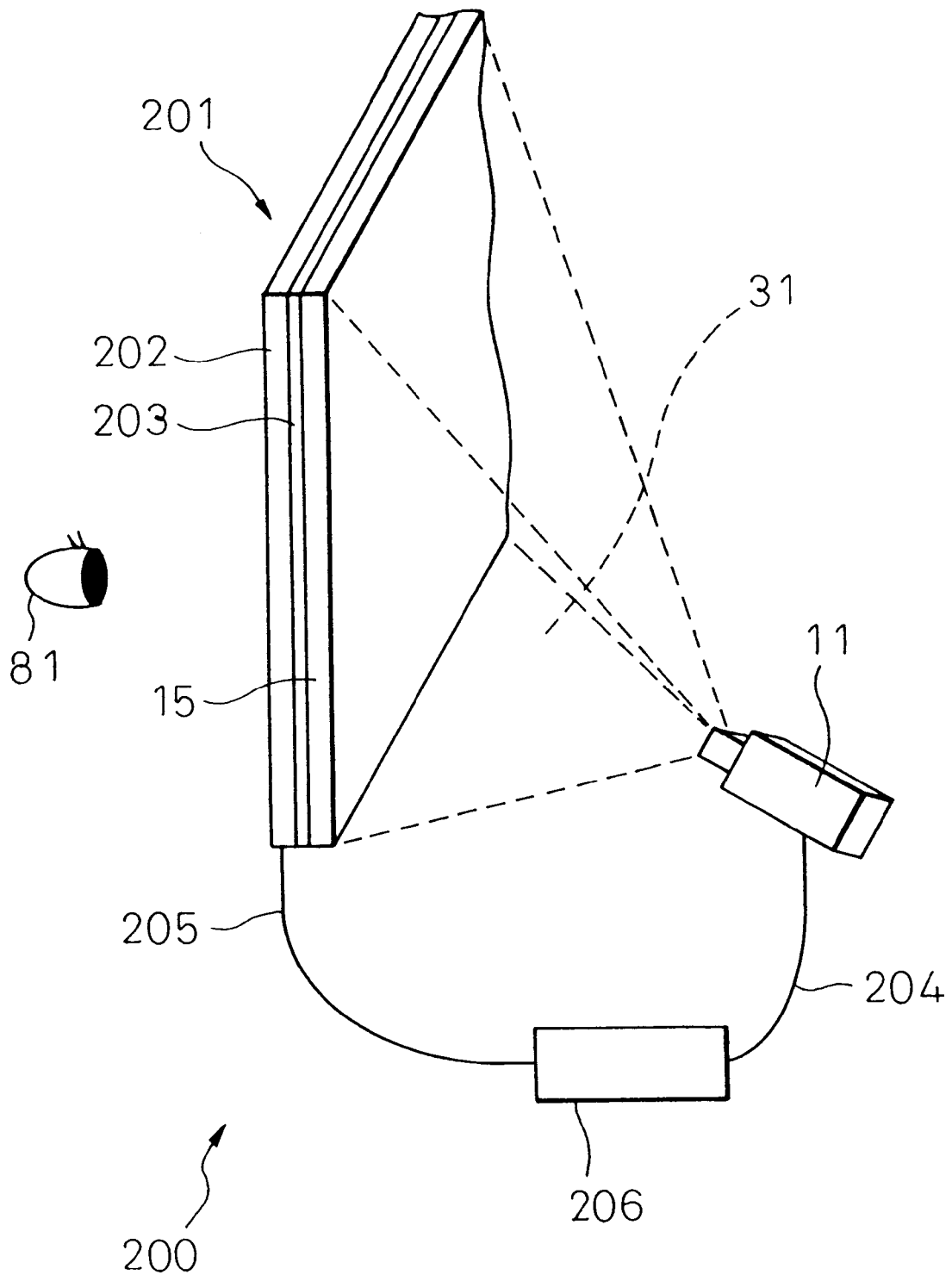
FIG. 20 shows an audio-video playback unit employing an apparatus for synthesizing and displaying images according to the present invention.

FIGS. 18A, 18B, and 19 show an automatic dispenser having a security system 131 according to the present invention.

The automatic dispenser 180 has a main body 181 and incorporates a money collector 182, a commodity dispensing port 183, a commodity storage space 184, and a control unit 185. The control unit 185 has a controller 187 for controlling a projector 11 in response to a signal from a pressure sensor 186.

A touch panel 188 is installed on the dispenser 180. The touch panel 188 is backed with a hologram screen 15. The touch panel 188 and hologram screen 15 provide the same functions as those of the embodiment 9 and display a commodity selection menu.

The projector 11 and a monitor 25 are installed inside the main body 181. The projector 11 projects image light 31 onto the hologram screen 15.

The pressure sensor 186 is arranged in front of the dispenser 180 and detects whether or not a customer 81 is in front of the dispenser 180.

Mechanisms of the dispenser 180 resemble those of the cash dispenser of the embodiment 9.

The monitor 25 is completely concealed from the customer 81 and other persons around the dispenser 180, so that the monitor 25 may sufficiently monitor scenes in front of the dispenser 180 without giving the customer 81 an unfavorable impression. The monitor 25 is installed just in front of the customer 81 to closely and clearly image and identify the customer 81.

A combination of the hologram screen 15 and projector 11 is able to display full-color moving pictures, to provide the dispenser 180 with good appearance and an advertisement effect.

To conceal the monitor 25, the dispenser 180 always displays images on the hologram screen 15. This attracts the eyes of passers-by to thereby achieve a sales promotion effect.

Other functions and effects of the embodiment 10 are the same as those of the embodiment 7.

FIG. 19 shows a system for controlling many automatic dispensers 180 each having a monitor 25. Monitored images 190 from the monitors 25 are collected by a central controller 193 through communication circuits 191 and a relay unit 192, to centrally control the dispensers 180.

An operator at the central controller 193 monitors the images 190. If any abnormality is observed, the operator issues an alarm 195 to a police station or a security office 194. Policemen or guards are dispatched to the dispenser 180 in question to cope with the abnormality.

Each of the dispensers 180 may have a mechanism for detecting an abnormality and issuing an alarm 196 to the central controller 193 through the communication circuits 191 and relay unit 192. The central controller 193 transfers the alarm 196 as it is to the security office 194. This system may save manpower.

The relay unit 192 may be a communication satellite to cover the dispensers 180 scattering over a wide area. In this case, the communication circuits 191 are radio circuits.

The relay unit 192 may be omitted, and the dispensers 180 may directly be connected to the central controller 193 through the communication circuits 191. The communication circuits 191 may be analog circuits, digital circuits, exclusive-use cable circuits, etc.

Embodiment 11

FIGS. 20 to 24 show an audio-video playback unit according to an embodiment 11 of the present invention.

The audio-video playback unit 200 has a transparent hologram element 15 on which a diffuser is recorded and a transparent flat speaker 202. The hologram element 15 and speaker 202 are laminated one upon another into an integrated audio-video screen 201. The playback unit 200 also has an audio-video supply unit 206 connected to a projector 11. The projector 11 projects image light 31 onto the screen 201.

Figure 21:
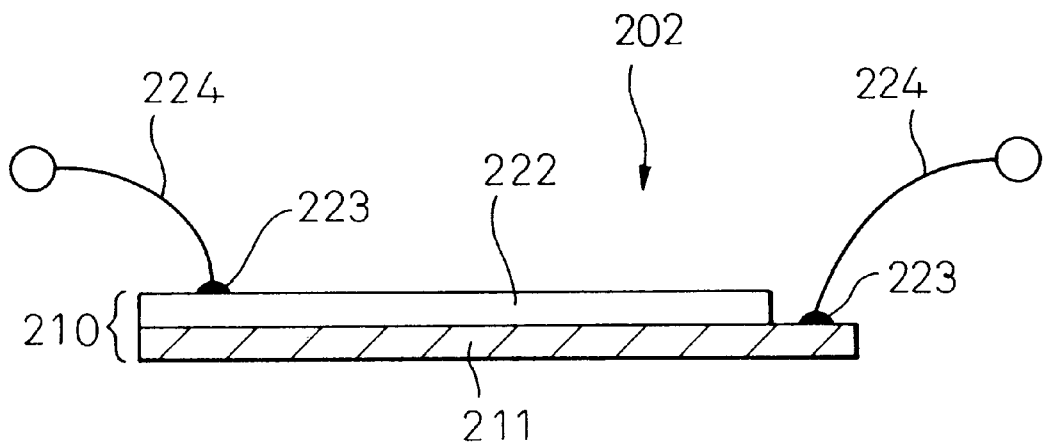
FIG. 21 shows a transparent unimorph flat speaker applicable to the playback unit of FIG. 20.

In FIG. 21, the speaker 202 consists of a sound generator 210 and electrodes 223. The sound generator 210 consists of a transparent substrate 211 and a transparent piezoelectric plate 222 attached to the substrate 211. The electrodes 223 are connected to leads 224. This structure forms a unimorph piezoelectric speaker. The leads 224 are connected to a power source (not shown).

The piezoelectric plate 222 is made of PLZT (an oxide of lead, lanthanum, zirconium, and titanium). The substrate 211 is made of ITO (an oxide of indium and titanium). The electrodes 224 are made of silver paste.

Figure 22:
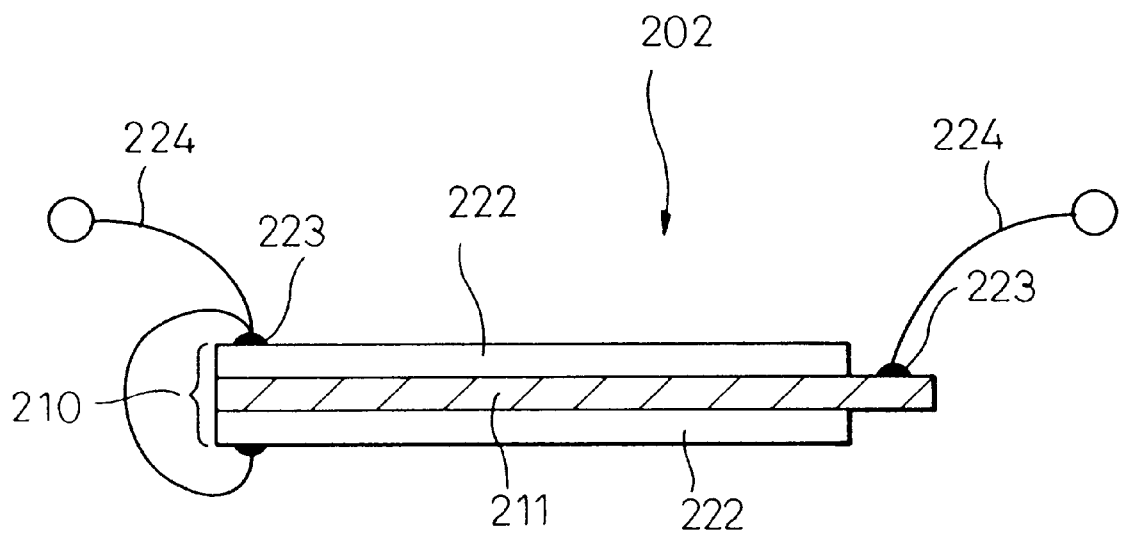
FIG. 22 shows a transparent bimorph flat speaker applicable to the playback unit of FIG. 20.

The speaker 202 may have a bimorph structure of FIG. 22. This structure consists of a sound generator 210 and electrodes 223. The sound generator 210 consists of a transparent substrate 211 and transparent piezoelectric plates 222 that sandwich the substrate 211. The electrodes 223 are connected to leads 224.

Figure 23:
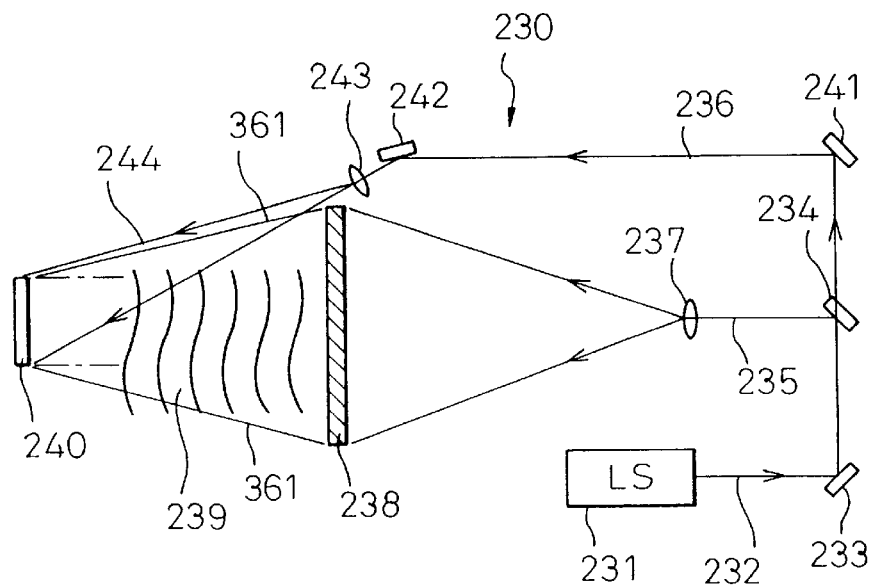
FIG. 23 shows a way of forming a transmission-type transparent hologram element applicable to the playback unit of FIG. 20.

The hologram element 15 is made by an optical exposing system 230 of FIG. 23. A beam is passed through an optical diffuser 238 made of ground glass to provide a diffused beam serving as an object beam. A non-diffused beam is used as a reference beam. The object and reference beams are made incident to a photosensitive material 240 and form interference fringes thereon. The photosensitive material 240 forms the hologram element 15.

More precisely, a laser source 231 emits a coherent beam 232. A mirror 233 changes the direction of the coherent beam 232, and a half-mirror 234 divides the beam into beams 235 and 236.

A lens 237 diverges the beam 235. The diverged beam is passed through the diffuser 238 to provide the object beam 239, which is made incident to the photosensitive material 240.

The other beam 236 from the half-mirror 234 is reflected by mirrors 241 and 242 and is diverged by a lens 243 to provide the reference beam 244, which is made incident to the photosensitive material 240.

The reference beam 244 and object beam 239 form interference fringes on the photosensitive material 240. Wavy lines in FIGS. 23 and 24 indicate diffused light.

The hologram element 15 may be of a reflection type. In this case, the projector 11 is arranged on the viewer's side with respect to the screen 201.

Figure 24:
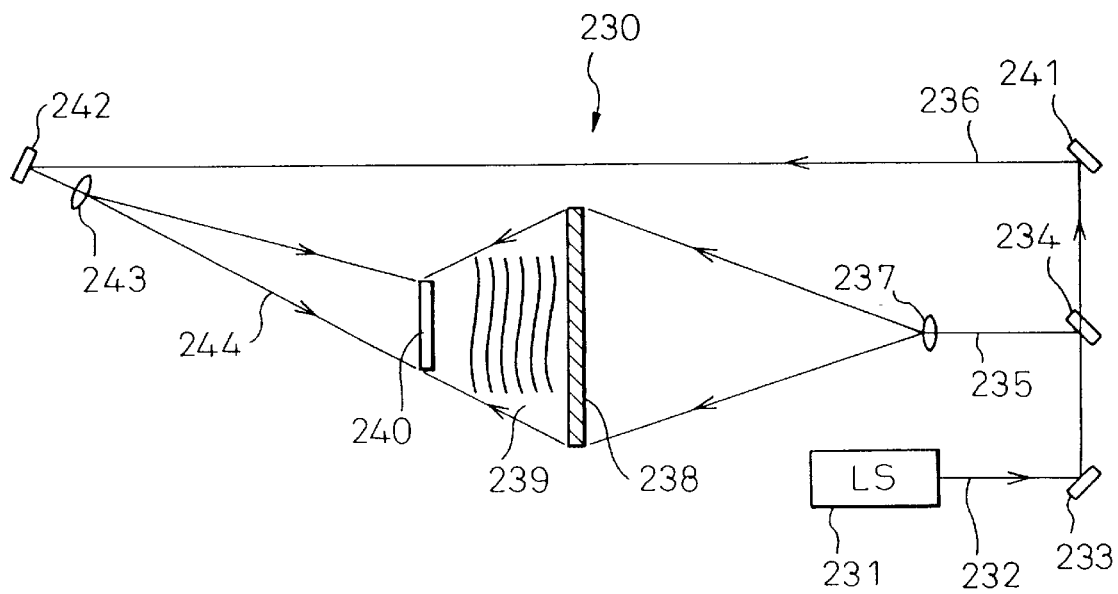
FIG. 24 shows a way of forming a reflection-type transparent hologram element applicable to the playback unit of FIG. 20.

The reflection-type transparent hologram element 15 is prepared by an optical exposing system 230 of FIG. 24 that makes a reference beam 244 and an object beam 239 oppositely incident to a photosensitive material 240 to form interference fringes thereon.

The hologram element 15 and flat speaker 202 are bonded to each other with a transparent adhesive 203, which may be an acrylic adhesive.

The projector 11 may be a liquid crystal projector, and the audio-video supply unit 206 may be an LD player.

The projector 11 and audio-video supply unit 206 are connected to each other through a video transmission cable 204. The speaker 202 and audio-video supply unit 206 are connected to each other through an audio transmission cable 205.

The operation of the audio-video playback unit 200 will be explained.

When the audio-video supply unit 206 is activated, it supplies a video signal to the projector 11, which projects image light 31 onto the screen 201. The hologram element 15 of the screen 201 diffracts and diffuses the image light 31 to reproduce images. The reproduced images passes through the speaker 202 and reach to the viewer 81.

An electric audio signal from the supply unit 206 is supplied to the speaker 202. The signal vibrates the piezoelectric plate 222, to reproduce sounds.

The effect of the embodiment 11 will be explained.

The screen 201 is an integration of the transparent hologram element 15 and transparent flat speaker 202.

The screen 201 serves as a completely new media that reproduces sounds and images in transparent space to strongly impress the viewer 81.

The screen 201 is transparent and never visually blocks the ambient space of the viewer 81. This improves the degree of freedom of installation of the screen 201 and develops new application fields for the screen 201.

Big conventional speakers are visually unpleasant.

On the other hand, the speaker 202 of the embodiment 11 is transparent and is integral with a screen. The speaker 202 is invisible to viewers, and the viewers do not sense the presence of the speaker 202. It is easy for the embodiment 11 to install a large speaker for providing large sounds. The sound volume of a speaker is basically dependent on the size thereof, and therefore, the larger the speaker the larger the sounds it provides.

Since the speaker and screen of the embodiment 11 are integral with each other, it appears to the viewer 81 that the images displayed on the screen are producing sounds.

Consequently, the screen 201 of the embodiment 11 reproduces lively images and sounds.

Namely, the audio-video playback unit 200 of the embodiment 11 effectively regenerates powerful sounds and lively images without giving viewers oppressive feelings.

The transparent hologram element 15 and transparent flat speaker 202 may be arranged side by side to form an audio-video screen. This screen is also capable of effectively reproducing powerful sounds and lively images without giving viewers oppressive feelings.

The transparent hologram elements and transparent flat speakers of the present invention may be laid side by side in a space, to form an audio-video screen.

Embodiment 12

Figure 25:
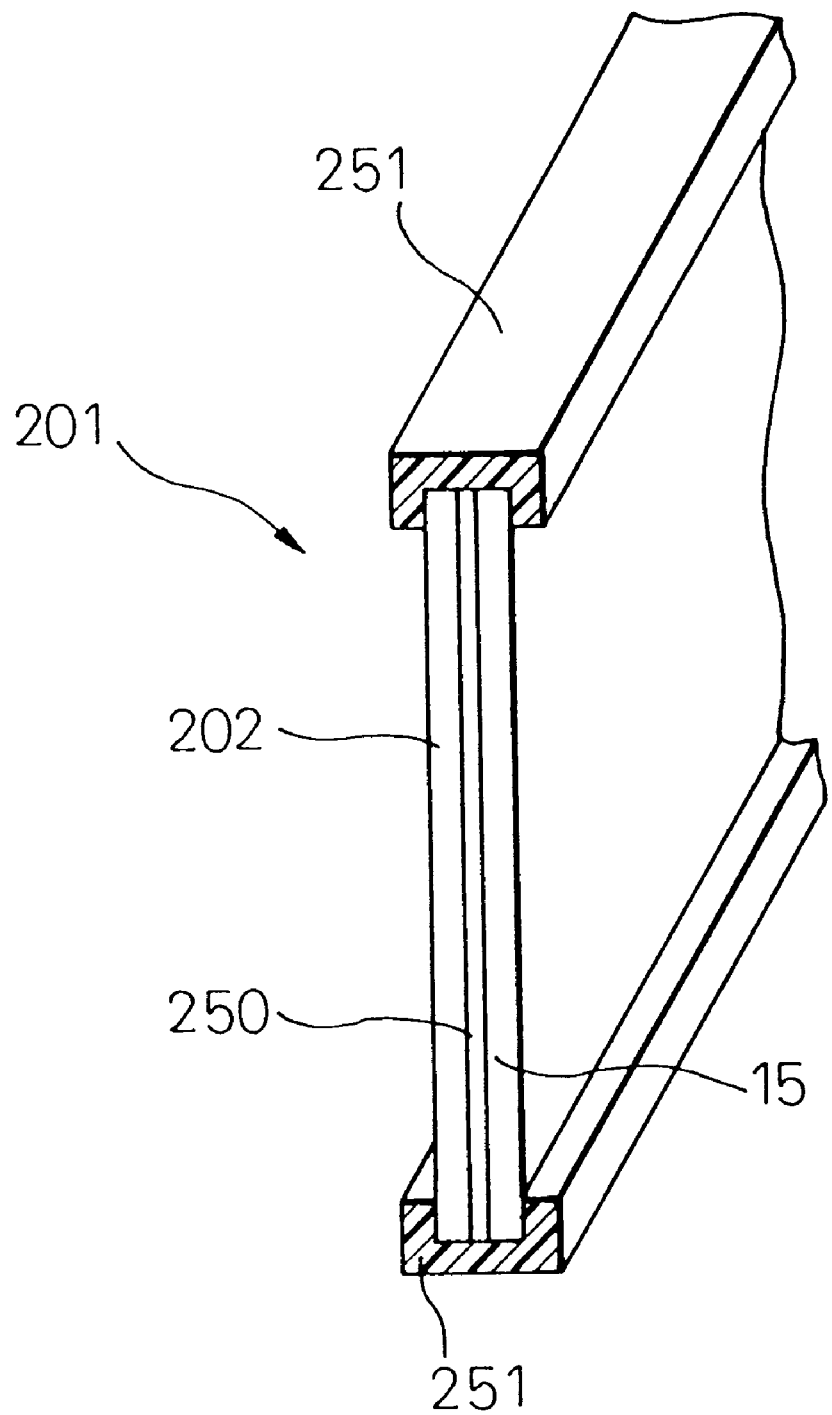
FIG. 25 shows an audio-video screen employing a transparent hologram element and a transparent flat speaker with silicon oil filled in a space between the hologram element and the speaker.

FIG. 25 shows an audio-video screen 201 according to an embodiment 12 of the present invention. The screen 201 consists of a transparent hologram element 15, a transparent flat speaker 202, and transparent silicon oil 250 filled in a space between the hologram element 15 and the speaker 202. A frame 251 is attached to the periphery of the screen 201, to seal the silicon oil 250.

The screen 201 is capable of preventing interfering reflection between the hologram element 15 and the speaker 202. This prevents a deterioration of images due to noise such as external disturbing light.

The silicon oil 250 functions as a shock absorber to prevent vibration when the speaker 202 produces very large sounds.

Other functions and effects of the embodiment 12 are the same as those of the embodiment 11.

Embodiment 13

The transparent hologram element and transparent flat speaker that are laminated one upon another, or arranged side by side according to the embodiments 11 and 12 may have different sizes.

If a smaller flat speaker is laminated on part of a hologram element where no image is reproduced, the flat speaker may not necessarily be transparent. Even if the flat speaker is opaque, a combination of the speaker and hologram element provides the effect of the present invention.

What is claimed is:

1. An apparatus for synthesizing the image of a viewer and a second image into a synthesized image and displaying the synthesized image, comprising:

a transparent hologram screen on which diffusing means is recorded;

imaging means for imaging the viewer through the hologram screen and providing the image of the viewer;

recording means for recording images including the second image;

synthesizing means for synthesizing the image of the viewer and the second image retrieved from the recording means into the synthesized image; and projecting means for projecting signal light containing the synthesized image onto the hologram screen.

2. The apparatus of claim 1 wherein the imaging means is arranged so that a line connecting a light entering point of the imaging means to the vicinity of the eyes of the viewer is aligned with a line connecting the vicinity of the eyes of the image of the viewer displayed on the hologram screen to the vicinity of the eyes of the viewer.

3. The apparatus of claim 1 or 2, wherein the hologram screen has a transmission-type hologram.

4. The apparatus of claim 1, further comprising:

rear shading means for blocking external light travelling toward the back of the hologram screen.

5. The apparatus of claim 3, further comprising:

rear shading means for blocking external light travelling toward the back of the hologram screen.

6. The apparatus of claim 1 or 4, further comprising:

front shading means for blocking external light travelling toward the front of the hologram screen.

7. The apparatus of claim 5, further comprising:

front shading means for blocking external light travelling toward the front of the hologram screen.

8. The apparatus of claim 2, further comprising:

front shading means for blocking external light travelling toward the front of the hologram screen.

9. An apparatus for synthesizing the image of a viewer and a second image into a synthesized image and displaying the synthesized image, comprising:

a transparent hologram screen on which a diffusing means is recorded;

background displaying means arranged behind the viewer for displaying a background image serving as the second image;

imaging means for simultaneously imaging the viewer and background image through the hologram screen and providing the synthesized image; and projecting means for projecting signal light containing the synthesized image onto the hologram screen.

10. The apparatus of claim 9, wherein the imaging means is arranged so that a line connecting a light entering point of the imaging means to the vicinity of the eyes of the viewer agrees with a line connecting the vicinity of the eyes of the image of the viewer displayed on the hologram screen to the vicinity of the eyes of the viewer.

11. The apparatus of claim 9 or 10, wherein the hologram screen has a transmission-type hologram.

12. The apparatus of claim 9, further comprising:

rear shading means for blocking external light travelling toward the back of the hologram screen.

13. The apparatus of claim 11, further comprising:

rear shading means for blocking external light travelling toward the back of the hologram screen.

14. The apparatus of claim 9 or 12, further comprising:

front shading means for blocking external light travelling toward the front of the hologram screen.

15. The apparatus of claim 13, further comprising:

front shading means for blocking external light travelling toward the front of the hologram screen.

16. The apparatus of claim 10, further comprising:

front shading means for blocking external light travelling toward the front of the hologram screen.

17. An apparatus for synthesizing the image of a viewer and a second image into a synthesized image and displaying the synthesized image, comprising:

projecting means for projecting signal light containing the second image;

a mirror arranged in front of the viewer; and a transmission-type hologram screen for diffracting the signal light and diffusing the signal light around a center angle that is different from an incident angle, the hologram screen and projecting means being arranged in front of the mirror so that the viewer may see a synthesis of the image of the viewer and the second image.

18. The apparatus of claim 17, further comprising:

front shading means for blocking external light coming from one side of the hologram screen opposite to the mirror or the half-mirror.

19. An apparatus for synthesizing the image of a viewen and a second image into a synthesized image and displaying the synthesized image, comprising:

projecting means for projecting signal light containing the second image;

a half-mirror arranged in front of the viewer; and a transmission-type hologram screen for diffracting the signal light and diffusing the same around a center angle that is different from an incident angle, the hologram screen and projecting means being arranged in front of or behind the half-mirror so that the viewer may see a synthesis of the image of the viewer and the second image.

20. The apparatus of claim 19, wherein two viewers are positioned on each side of the hologram screen, and one side of the hologram screen is shaded so that each of the viewers may see a synthesis of the image of the viewer whose side is not shaded and the second image.

21. The apparatus of any one of claims 19 and 20, further comprising:

rear shading means for blocking external light directly entering the half-mirror.

22. The apparatus of claim 21, further comprising:

front shading means for blocking external light coming from one side of the hologram screen opposite to the mirror or the half-mirror.

23. The apparatus of claim 20, further comprising:

front shading means for blocking external light coming from one side of the hologram screen opposite to the mirror or the half-mirror.

24. The apparatus of claim 3, further comprising:

front shading means for blocking external light travelling toward the front of the hologram screen.

25. The apparatus of claim 11, further comprising:

front shading means for blocking external light travelling toward the front of the hologram screen.

* * * * *

UNITED STATES PATENT AND TRADEMARK OFFICE
CERTIFICATE OF CORRECTION

PATENT NO. : 5,993,006
DATED : November 30, 1999
INVENTOR(S) : Yoshinobu Takeuchi, et al.

It is certified that error appears in the above-identified patent and that said Letters Patent is hereby corrected as shown below:

On the title page, Item [75], inventors should read --Yoshinobu Takeuchi, Kuwana, Japan; Seiichiro Suzuki, Nagoya, Japan--.

Signed and Sealed this

Nineteenth Day of December, 2000

Attest:

Q. TODD DICKINSON

Attesting Officer

Commissioner of Patents and Trademarks